(12) United States Patent
Mori et al.

(10) Patent No.: US 10,780,685 B2
(45) Date of Patent: Sep. 22, 2020

(54) HARD COAT LAMINATED FILM

(71) Applicant: RIKEN TECHNOS CORPORATION, Tokyo (JP)

(72) Inventors: Masataka Mori, Tokyo (JP); Nozomu Washio, Tokyo (JP); Taketo Hashimoto, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 77 days.

(21) Appl. No.: 15/559,405

(22) PCT Filed: Feb. 16, 2016

(86) PCT No.: PCT/JP2016/054363
§ 371 (c)(1),
(2) Date: Sep. 18, 2017

(87) PCT Pub. No.: WO2016/147776
PCT Pub. Date: Sep. 22, 2016

(65) Prior Publication Data
US 2018/0079194 A1    Mar. 22, 2018

(30) Foreign Application Priority Data

| Mar. 18, 2015 | (JP) | 2015-054437 |
| Nov. 25, 2015 | (JP) | 2015-229330 |
| Feb. 9, 2016 | (JP) | 2016-022340 |

(51) Int. Cl.
| B32B 27/30 | (2006.01) |
| B32B 27/34 | (2006.01) |
| B32B 7/02 | (2019.01) |
| B32B 5/16 | (2006.01) |
| C09D 7/40 | (2018.01) |
| C08L 33/26 | (2006.01) |
| B32B 37/14 | (2006.01) |
| B05D 7/00 | (2006.01) |
| C08J 7/04 | (2020.01) |
| C09D 133/26 | (2006.01) |

(52) U.S. Cl.
CPC ............ *B32B 37/144* (2013.01); *B05D 7/536* (2013.01); *B32B 5/16* (2013.01); *B32B 7/02* (2013.01); *B32B 27/30* (2013.01); *B32B 27/308* (2013.01); *B32B 27/34* (2013.01); *C08J 7/042* (2013.01); *C08L 33/26* (2013.01); *C09D 7/40* (2018.01); *C09D 133/26* (2013.01); *B32B 2250/40* (2013.01); *B32B 2255/10* (2013.01); *B32B 2307/412* (2013.01); *B32B 2307/536* (2013.01)

(58) Field of Classification Search
None
See application file for complete search history.

(56) References Cited

U.S. PATENT DOCUMENTS

| 3,496,143 | A | 2/1970 | Siggel et al. |
| 6,055,823 | A | 5/2000 | Baker et al. |
| 6,489,015 | B1 | 12/2002 | Tsuchiya et al. |
| 10,596,739 | B2 | 3/2020 | Washio et al. |
| 2005/0249942 | A1* | 11/2005 | Coggio ................. B32B 27/18 428/336 |
| 2006/0134400 | A1 | 6/2006 | Takada et al. |
| 2006/0210727 | A1 | 9/2006 | Ibuki et al. |
| 2007/0231566 | A1* | 10/2007 | Yoneyama ............ G02B 1/105 428/331 |
| 2007/0291363 | A1 | 12/2007 | Asakura et al. |
| 2010/0147191 | A1 | 6/2010 | Sakano et al. |
| 2010/0210812 | A1 | 8/2010 | Urakawa et al. |
| 2012/0114892 | A1 | 5/2012 | Jung et al. |
| 2013/0059158 | A1 | 3/2013 | Oguro et al. |
| 2013/0084458 | A1 | 4/2013 | Yamada et al. |
| 2013/0222906 | A1 | 8/2013 | Tsunekawa et al. |
| 2014/0004891 | A1* | 1/2014 | Baca ....................... H04W 4/12 455/466 |
| 2014/0044891 | A1 | 2/2014 | Shibata et al. |

(Continued)

FOREIGN PATENT DOCUMENTS

| CN | 103492913 A | 1/2014 |
| CN | 104422239 A | 3/2015 |

(Continued)

OTHER PUBLICATIONS

JP6144330 Opposition Paper dated Dec. 5, 2017; 45 Pgs.
Yamamoto, et al.; Application of Chemically Absorbed Fluorocarbon Film with Highly Durability as a Mold Release Agent; Seikei-Kakou vol. 22 No. 2, 2010; pp. 104-114.
PCT/JP2016/084794 International Search Report dated Jan. 25, 2017; 2 pgs.
TW105104029 Office Action dated Mar. 7, 2019; 12 pgs.
CN201680015850.6 Office Action dated Jan. 24, 2019; 10 pgs.
KR10-2016-7017502 Office Action dated Oct. 27, 2017; 18pgs.
PCT/JP2016/084981 International Search Report dated Jan. 25, 2017; 2 pgs.

(Continued)

*Primary Examiner* — Sheeba Ahmed
(74) *Attorney, Agent, or Firm* — Bracewell LLP; Brad Y. Chin

(57) ABSTRACT

A hard coat laminated film according to at least one embodiment has, from the surface layer side, a first hard coat and a transparent resin film layer. The first hard coat is formed from a coating material including: (A) 100 parts by mass of a polyfunctional (meth)acrylate; and (B) 1-100 parts by mass of an N-substituted (meth)acrylamide compound. The transparent resin film has a first hard coat forming surface which is a poly(meth)acrylic imide resin. A hard coat laminated film according to another embodiment has, from the surface layer side, a second hard coat, the first hard coat and the transparent resin film layer. The second hard coat is formed from a coating material which includes: (A) 100 parts by mass of a polyfunctional (meth)acrylate; (E) 0.01-7 parts by mass of a water repelling agent; and (F) 0.01-10 parts by mass of a silane coupling agent; without inorganic particles.

16 Claims, 2 Drawing Sheets

(56) References Cited

U.S. PATENT DOCUMENTS

| | | | |
|---|---|---|---|
| 2014/0208657 A1 | 7/2014 | Kim et al. | |
| 2014/0227482 A1 | 8/2014 | Shibata et al. | |
| 2014/0360975 A1 | 12/2014 | Hustad et al. | |
| 2015/0203711 A1 | 7/2015 | Kang et al. | |
| 2016/0122525 A1 | 5/2016 | Carloff et al. | |
| 2016/0122573 A1 | 5/2016 | Uprety et al. | |
| 2016/0229159 A1* | 8/2016 | Nakashima | B32B 27/08 |
| 2017/0095993 A1 | 4/2017 | Tomomatsu et al. | |
| 2017/0183543 A1 | 6/2017 | Nagata et al. | |
| 2017/0198164 A1 | 7/2017 | Itagaki et al. | |
| 2018/0072029 A1 | 3/2018 | Nakashima et al. | |

FOREIGN PATENT DOCUMENTS

| | | |
|---|---|---|
| EP | 2873692 A1 | 5/2015 |
| JP | S633011 A | 1/1988 |
| JP | H0211665 A | 1/1990 |
| JP | H0419142 A | 1/1992 |
| JP | H0794061 A | 4/1995 |
| JP | 2000052472 A | 2/2000 |
| JP | 2000190430 A | 7/2000 |
| JP | 2000214791 A | 8/2000 |
| JP | 2000517455 A | 12/2000 |
| JP | 2002062405 A | 2/2002 |
| JP | 2006058574 A | 3/2006 |
| JP | 2006215488 A | 8/2006 |
| JP | 2007537059 A | 12/2007 |
| JP | 2008026883 A | 2/2008 |
| JP | 2008095064 A | 4/2008 |
| JP | 2008201864 A | 9/2008 |
| JP | 2008538195 A | 10/2008 |
| JP | 2009114248 A | 5/2009 |
| JP | 2009196125 A | 9/2009 |
| JP | 2009279806 A | 12/2009 |
| JP | 2010024255 A | 2/2010 |
| JP | 2010064332 A | 2/2010 |
| JP | 2010054861 A | 3/2010 |
| JP | 2010060190 A | 3/2010 |
| JP | 2010064332 A | 3/2010 |
| JP | 2010078642 A | 4/2010 |
| JP | 2010511206 A | 4/2010 |
| JP | 2010131771 A | 6/2010 |
| JP | 2010208035 A | 9/2010 |
| JP | 2010211150 A | 9/2010 |
| JP | 2010224150 A | 10/2010 |
| JP | 2010241019 A | 10/2010 |
| JP | 2010271400 A | 12/2010 |
| JP | 2010275385 A | 12/2010 |
| JP | 2011032350 A | 2/2011 |
| JP | 2011032350 A1 | 2/2011 |
| JP | 2011037927 A | 2/2011 |
| JP | 2011512422 A | 4/2011 |
| JP | 2011128439 A | 6/2011 |
| JP | 2011133862 A | 7/2011 |
| JP | 2011175040 A | 9/2011 |
| JP | 2011201087 A | 10/2011 |
| JP | 2011213989 A | 10/2011 |
| JP | 2012062385 A | 3/2012 |
| JP | 02012111943 * | 6/2012 |
| JP | 2012234163 A | 11/2012 |
| JP | 2012250438 A | 12/2012 |
| JP | 2013075466 A | 4/2013 |
| JP | 2013076029 A | 4/2013 |
| JP | 2013142113 A | 7/2013 |
| JP | 2013173871 A | 9/2013 |
| JP | 201431397 A | 2/2014 |
| JP | 2014024332 A | 2/2014 |
| JP | 2014025061 A | 2/2014 |
| JP | 2014040017 A | 3/2014 |
| JP | 2014043101 A | 3/2014 |
| JP | 2014062709 A | 4/2014 |
| JP | 2014080536 A | 5/2014 |
| JP | 2014117904 A | 6/2014 |
| JP | 2014143831 * | 7/2014 |
| JP | 2014152237 A | 8/2014 |
| JP | 2014201681 A | 10/2014 |
| JP | 2014238614 A | 12/2014 |
| JP | 2015013472 A | 1/2015 |
| JP | 2015013473 A | 1/2015 |
| JP | 2015016683 A | 1/2015 |
| JP | 2015033851 A | 2/2015 |
| JP | 2015034285 A | 2/2015 |
| JP | 2015034286 A | 2/2015 |
| JP | 2015083370 A | 4/2015 |
| JP | 2015151420 A | 8/2015 |
| JP | 2015182272 A | 10/2015 |
| JP | 2015182273 A | 10/2015 |
| JP | 2015203770 A | 11/2015 |
| JP | 2016006160 A | 1/2016 |
| JP | 2016011365 A | 1/2016 |
| JP | 5870222 B1 | 2/2016 |
| JP | 5878255 A | 3/2016 |
| JP | 2016050285 A | 4/2016 |
| JP | 2016060839 A | 4/2016 |
| JP | 2016172423 A | 9/2016 |
| JP | 2016172424 A | 9/2016 |
| JP | WO2015098495 A1 | 3/2017 |
| JP | 2017200042 A | 11/2017 |
| KR | 1020040094153 A | 11/2001 |
| KR | 20100129512 A | 12/2010 |
| KR | 10-2013-0058565 A | 12/2014 |
| TW | 200609110 A | 3/2006 |
| TW | 201300236 A | 1/2013 |
| TW | 201420652 A | 6/2014 |
| TW | 201437304 A | 10/2014 |
| TW | 201504320 A | 2/2015 |
| TW | 201602268 A | 1/2016 |
| WO | 2005113690 A2 | 12/2005 |
| WO | 2006102383 A1 | 9/2006 |
| WO | 2008029766 A1 | 3/2008 |
| WO | 2008067262 A1 | 6/2008 |
| WO | 2009113537 A1 | 9/2009 |
| WO | 2010079653 A1 | 7/2010 |
| WO | 2011033976 A1 | 3/2011 |
| WO | 2011145630 A1 | 11/2011 |
| WO | 2012026446 A1 | 3/2012 |
| WO | 2012144508 A1 | 10/2012 |
| WO | 2012144510 A1 | 10/2012 |
| WO | 2013129531 A1 | 9/2013 |
| WO | 2014030848 A1 | 2/2014 |
| WO | 2014203792 A1 | 12/2014 |
| WO | 2015005049 A1 | 1/2015 |
| WO | 2015146565 A1 | 1/2015 |
| WO | 2015033754 A1 | 3/2015 |
| WO | 2015045823 A1 | 4/2015 |
| WO | 201509845 A1 | 7/2015 |
| WO | 2015098495 A1 | 7/2015 |
| WO | 2015001948 A1 | 8/2015 |
| WO | 2015171340 A1 | 11/2015 |
| WO | 2015182253 A1 | 12/2015 |
| WO | 2016147424 A1 | 9/2016 |
| WO | 2016147733 A1 | 9/2016 |
| WO | 2016147734 A1 | 9/2016 |
| WO | 2016147739 A1 | 9/2016 |
| WO | 2016147776 A1 | 9/2016 |
| WO | 2017200042 A | 11/2017 |

OTHER PUBLICATIONS

Artham, et al., Biodegradation of Aliphatic and Aromatic Polycarbonates, Macromol. Biosci, 2008, 8, 14-24. (Year: 2008).
CN201680015900.0 Office Action dated Nov. 5, 2018; 12 pgs.
CN201680015984.8 Office Action dated Nov. 5, 2018; 13 pgs.
CN201580003516.4 Office Action dated Jan. 17, 2018; 20 pgs.
Lai, et al., Synthetic Process and Application of Silicone Products, 2nd Edition, Nov. 2009, 4 pgs.
EP16764565.4 Extended European Search Report dated Oct. 18, 2018; 8 pgs.
KR10-2019-7001505 Office Action dated Feb. 20, 2019; 12 pgs.
KR10-2017-7026048 Korean Office Action dated Nov. 1, 2018; 14 pgs.
EP15885519.7 Extended European Search Report dated Oct. 18, 2018; 8PGS.

(56) References Cited

OTHER PUBLICATIONS

EP16764564.7 Extended European Search Report dated Oct. 18, 2018; 8 pgs.
EP16764607.4 Search Report dated May 28, 2018; 8 pgs.
PCT/JP2016/052927 International Search Report dated Apr. 19, 2016; 2 pgs.
PCT/JP2016/052950 International Search Report dated Apr. 19, 2016; 2 pgs.
PCT/JP2016/053357 International Search Report dated May 17, 2016; 2 pgs.
PCT/JP2016/053355 International Search Report dated May 17, 2016; 2 pgs.
PCT/JP2016/053556 International Search Report dated May 17, 2016; 2 pgs.
CN201680015902.X Office Action dated Feb. 3, 2019; 15 pgs.
PCT/JP2017/027297 International Search Report dated Aug. 29, 2017; 2 pgs.
JP2017-152119 Office Action dated Aug. 7, 2018; 10 pgs.
EP16764570.4 Search Report dated May 28, 2018; 8 pgs.
KR10-2016-7017502 Decision of Rejection dated May 10, 2018; 8 pgs.
CN201580003516.4 Office Action dated Jun. 28, 2017; 22 pgs.
JP2015-054439 Office Action dated Aug. 24, 2016; 31 pgs.
TW104122442 Office Action dated Jul. 13, 2016; 24 pgs.
JP2017069555 Office Action dated Nov. 27, 2018; 8 pgs.
CN201680015901.5 Office Action dated Jan. 28, 2019; 12 pgs.
EP16764550.6 Extended European Search Report dated Oct. 18, 2018; 8 pgs.
CN201680015908.7 Office Action dated Feb. 2, 2019; 12 pgs.
PCT/JP2016/084981 International Preliminary Report on Patentability dated Jun. 21, 2018; 13 pgs.
PCT/JP2016/054363 International Search Report dated May 17, 2016; 2 pgs.
TW105104050 Office Action dated Aug. 20, 2019; 12 pgs.
CN201680015902.X Second Office Action dated Jul. 17, 2019; 16 pgs.
TW105104027 Office Action dated Jun. 25, 2019; 21 pages.
CN201680015900.0 Office Action dated Sep. 10, 2019, 13 pgs.
CN201680015984.8 Office Action dated Sep. 10, 2019, 13 pgs.
Chinese Patent Application No. 201680015900.0 dated Jun. 4, 2019; 8 pgs.
PCT/JP2017/040099 International Search Report dated Feb. 13, 2018; 4 pgs.
Chinese Patent Application No. 201680015984.8 dated Jun. 4, 2019; 8 pgs.
EP16872835.0 Extended European Search Report dated Jul. 8, 2019; 6 pgs.
EP16868622.8 Extended European Search Report dated May 20, 2019; 8 pgs.
TW105104240 Office Action dated Oct. 17, 2019, 10 pgs.
JP2017-094366 Office Action dated Nov. 18, 2019, 11 pgs.
EP15885519.7 Third Party Observations dated Jan. 8, 2020, 85 pgs.
TW105104026 Office Action dated Oct. 5, 2019; 10 pgs.
CN201680068951.X Office Action dated Sep. 29, 2019; 21 pgs.
CN201680015902.X Office Action dated Jan. 2, 2020, 16 pgs.
CN201811070889.5 Office Action dated Jan. 10, 2020, 15 pgs.
JP2016-29588 Office Action dated Dec. 24, 2019, 7 pgs.
JP2016-17863 Office Action dated Oct. 8, 2019; 11 pgs.
TW105104907 Office Action dated Oct. 18, 2019; 10 pages.
CN201810254960.9 Office Action dated Oct. 11, 2019, 13 pgs.
EP20150373.7 Extended European Search Report dated Apr. 7, 2020, 9 pgs.
EP20150365.3 Extended European Search Report dated Apr. 9, 2020, 8 pgs.
EP20150371.1 Extended European Search Report dated Apr. 7, 2020, 8 pgs.
JP2017-094366 Office Action dated May 11, 2020, 15 pgs.
JP2017-94366 Office Action dated May 11, 2020, 15 pgs.
JP2016-24288 Opposition Against JP6599789 dated Jun. 24, 2020, 64 pgs.
Website of Fluorolink@PFPE (including a flurorine-containing water repellent agent "Fluorolink AD 1700"), https://www.solvay.jp/ja/markets-and-products/featured-products/Fluorolink.html, Jan. 7, 2020, 2pgs.
CN201810254960.9 Second Office Action dated Jun. 9, 2020, 11 pgs.
EP17874537.8 Supplementary Search Report dated May 14, 2020, 12 pgs.
EP17850559.0 Supplementary Search Report dated Mar. 18, 2020, 10 pgs.
CN201780055888.0 First Office Action dated Jul. 2, 2020, 11 pgs.

* cited by examiner

HARD COAT LAMINATED FILM

CROSS REFERENCE TO RELATED APPLICATIONS

This application claims the benefit of and priority to PCT/JP2016/054363, filed on Feb. 16, 2016, entitled (translation), "HARD COAT LAMINATED FILM," which claims the benefit of and priority to Japanese Patent Application Nos. 2015-054437, filed on Mar. 18, 2015, 2015-229330, filed on Nov. 25, 2015, and 2015-022340, filed on Feb. 9, 2016, each of which is hereby incorporated by reference in their entirety into this application.

BACKGROUND

Field

Embodiments relate to a novel hard coat laminated film.

Background Art

In recent years, a touch panel installed on an image display apparatus such as a liquid crystal display, a plasma display, or an electroluminescence display and capable inputting by touching the touch panel with a finger, a pen, or the like while watching a displayed object, has become popular.

For a display face plate of a touch panel, an article using glass as a substrate thereof has been conventionally used because glass meets required characteristics such as heat resistance, dimensional stability, high transparency, high surface hardness, or high rigidity. On the other hand, glass has disadvantages such as low impact resistance and consequent fragility; low processability; difficulty in handling; a high specific gravity and a consequent heavy weight; and difficulty in satisfying demand for making a display curved or flexible. Therefore, a material substituted for glass has been actively studied, and many hard coat laminated films each having a hard coat having excellent surface hardness and excellent abrasion resistance formed on a surface of a transparent resin film formed of triacetylcellulose, polyethylene terephthalate, polycarbonate, polymethyl methacrylate, a norbornene polymer, or the like have been proposed (for example, see JP 2000-052472 A and JP 2000-214791 A). However, adhesiveness between the hard coat and a film substrate is still insufficient. In addition, abrasion resistance of these hard coat laminated films is still insufficient, and a hard coat laminated film capable of maintaining surface characteristics such as finger slidability even after repeated wipes with a handkerchief or the like has been required.

SUMMARY

An object of the various embodiments is to provide a hard coat laminated film having excellent adhesiveness between a hard coat and a film substrate having a hard coat forming surface made of a poly(meth)acrylimide resin.

According to at least one embodiment, the above object can be achieved by a specific hard coat laminated film.

According to at least one embodiment, there is provided a hard coat laminated film including, from a surface layer side, a first hard coat and a transparent resin film layer, in which the first hard coat is formed of a coating material including: (A) 100 parts by mass of a polyfunctional (meth) acrylate; and (B) 1 to 100 parts by mass of an N-substituted (meth)acrylamide compound, and the transparent resin film has a first hard coat forming surface made of a poly(meth) acrylimide resin.

According to at least one embodiment, component (B) is acryloyl morpholine.

According to at least one embodiment, the first hard coat forming coating material further includes (C) 5 to 300 parts by mass of inorganic fine particles having an average particle diameter of 1 to 300 nm.

According to at least one embodiment, the hard coat laminated film described above, further includes, from a surface layer side, a second hard coat, the first hard coat, and the transparent resin film layer, in which the second hard coat is formed of a coating material including: (A) 100 parts by mass of the polyfunctional (meth)acrylate; (E) 0.01 to 7 parts by mass of a water repelling agent; and (F) 0.01 to 10 parts by mass of a silane coupling agent; and containing no inorganic particles.

According to at least one embodiment, the first hard coat forming coating material further includes (D) 0.01 to 1 part by mass of a leveling agent.

According to at least one embodiment, the transparent resin film is a transparent multilayer film obtained by laminating: (α1) a first poly(meth)acrylimide resin layer; (β) an aromatic polycarbonate resin layer; and (α2) a second poly(meth)acrylimide resin layer, directly in this order.

According to another embodiment, there is provided an article including the hard coat laminated film described above.

Embodiments provide non-obvious advantages over the conventional art. For example, a hard coat laminated film according to at least one embodiment has excellent adhesiveness between a hard coat and a film substrate. A hard coat laminated film according to at least one embodiment has excellent adhesiveness between a hard coat and a film substrate, and excellent abrasion resistance. Therefore, this hard coat laminated film can be suitably used as a member of an image display apparatus such as a liquid crystal display, a plasma display, or an electroluminescence display (including an image display apparatus having a touch panel function and an image display apparatus having no touch panel function), particularly as a display face plate of an image display apparatus having a touch panel function. In addition, the hard coat laminated film according to at least one embodiment can be suitably used as a window, a windshield, or the like for a vehicle, a window, a door, or the like for a building, a protective plate or the like for an electronic signboard, a front panel or the like for a household electric appliance such as a refrigerator, a door or the like for furniture such as a cupboard, a housing or the like for a television, a personal computer, a tablet type information device, or a smartphone, a show window, or the like.

DETAILED DESCRIPTION

Figure 1:
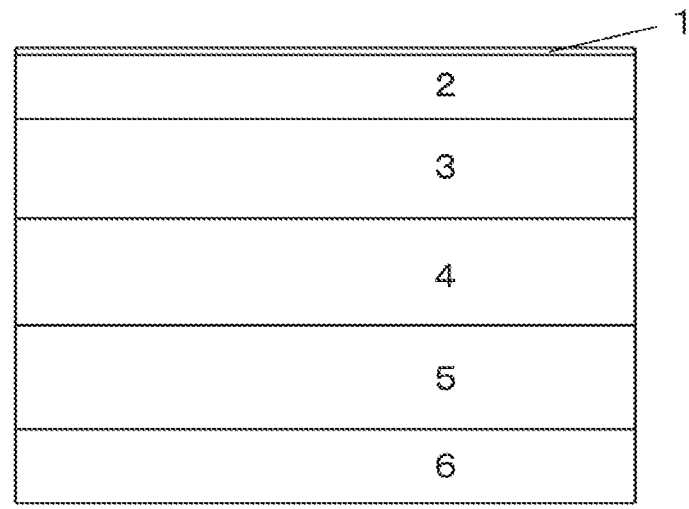
FIG. 1 is a conceptual cross-sectional view exemplifying a hard coat laminated film according to at least one embodiment.

Here, the term "film" is used as a term including a sheet. The term "resin" is used as a term including a resin mixture including two or more resins and a resin composition including a component other than a resin.

A hard coat laminated film according to at least one embodiment includes, from a surface layer side, a first hard coat and a transparent resin film layer. A hard coat laminated film according to at least one embodiment includes, from a surface layer side, a second hard coat, a first hard coat, and a transparent resin film layer. The "surface layer side" referred to herein means a side closer to an outer surface (a visible surface in a case of a display face plate) when an article produced using a hard coat laminated film is used on site. In addition, here, disposing one layer on a "surface layer side" of another layer includes laminating these layers directly and laminating these layers with one or more other layers such as an anchor coat interposed therebetween.

First Hard Coat

The first hard coat is formed of a coating material including (A) 100 parts by mass of a polyfunctional (meth)acrylate; and (B) 1 to 100 parts by mass of an N-substituted (meth)acrylamide compound.

(A) Polyfunctional (Meth)Acrylate

The polyfunctional (meth)acrylate of component (A) is a (meth)acrylate having two or more (meth)acryloyl groups in one molecule. This component has two or more (meth)acryloyl groups in one molecule, and therefore serves to form a hard coat through polymerization and curing with an active energy ray such as an ultraviolet ray or an electron beam.

Examples of the polyfunctional (meth)acrylate include a (meth)acryloyl group-containing bifunctional reactive monomer such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl) propane, or 2,2'-bis(4-(meth)acryloyloxypolypropyleneoxyphenyl) propane; a (meth)acryloyl group-containing trifunctional reactive monomer such as trimethylolpropane tri(meth)acrylate, trimethylolethane tri(meth)acrylate, or pentaerythritol tri(meth)acrylate; a (meth)acryloyl group-containing tetrafunctional reactive monomer such as pentaerythritol tetra(meth)acrylate; a (meth)acryloyl group-containing hexafunctional reactive monomer such as dipentaerythritol hexaacrylate; a (meth)acryloyl group-containing octafunctional reactive monomer such as tripentaerythritol acrylate; and a polymer (oligomer and prepolymer) including one or more kinds thereof as constituent monomers. As the polyfunctional (meth)acrylate of component (A), these compounds can be used singly or in a mixture of two or more kinds thereof. The term (meth)acrylate herein means an acrylate or a methacrylate.

(B) N-Substituted (Meth)Acrylamide Compound

The N-substituted (meth)acrylamide compound of component (B) serves to improve adhesiveness between the transparent resin film having a first hard coat forming surface made of a poly(meth)acrylimide resin and the first hard coat due to a structure thereof.

The N-substituted (meth)acrylamide compound of component (B) is not particularly limited, but typically may be a compound having a structure represented by the following general formula (1). The "N-substituted (meth)acrylamide compound" herein includes both an N-substituted acrylamide compound and an N-substituted methacrylamide compound. The N-substituted (meth)acrylamide compound of component (B) can improve adhesiveness between the transparent resin film having a first hard coat forming surface made of a poly(meth)acrylimide resin and the first hard coat because of having such a structure. Therefore, in the hard coat laminated film according to at least one embodiment, the first hard coat may be formed directly on the first hard coat forming surface of the transparent resin film. In the hard coat laminated film according to the present invention, the first hard coat is formed of a coating material including the N-substituted (meth)acrylamide compound of component (B). Therefore, the first hard coat forming surface of the transparent resin film does not need to be subjected to an adhesion-facilitating treatment such as a corona discharge treatment or anchor coat formation. This brings about such an advantage that a production efficiency can be improved and production cost can be reduced. The first hard coat forming surface (or both surfaces) of the transparent resin film may be optionally subjected to an adhesion-facilitating treatment such as a corona discharge treatment or anchor coat formation.

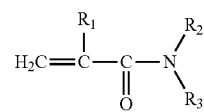

(1)

(In the formula, $R_1$ represents a hydrogen atom or a methyl group, $R_2$ represents a hydrogen atom or an alkyl group having 1 to 6 carbon atoms, $R_3$ represents an alkyl group having 1 to 6 carbon atoms, optionally having a hydroxy group or an amino group, or $R_2$ and $R_3$ form a 5- or 6-membered ring optionally having an oxygen atom as a ring member together with a nitrogen atom to which $R_2$ and $R_3$ are bonded.)

Examples of the N-substituted (meth)acrylamide of component (B) include N-methylacrylamide, N-methylmethacrylamide, N-methylolacrylamide butyl ether, N-methylolmethacrylamide butyl ether, N-ethylacrylamide, N-ethylmethacrylamide, N-n-propylacrylamide, N-n-propylmethacrylamide, N-isopropylacrylamide, N-isopropylmethacrylamide, N-cyclopropylacrylamide, N-cyclopropylmethacrylamide, diacetone acrylamide, diacetone methacrylamide, N-hydroxymethyl acrylamide, N-hydroxymethyl methacrylamide, N-hydroxyethyl acrylamide, N-hydroxyethyl methacrylamide, N,N-dimethyl acrylamide, N,N-dimethyl methacrylamide, N,N-diethyl acrylamide, N,N-diethyl methacrylamide, N-methyl,N-ethyl acrylamide, N-methyl,N-ethyl methacrylamide, N,N-dimethylaminopropyl acrylamide, N,N-dimethylaminopropyl methacrylamide, N-methylolacrylamide methyl ether, N-methylolmethacrylamide methyl ether, N-methylolacrylamide ethyl ether, N-methylolmethacrylamide ethyl ether, N-methylolacrylamide propyl ether, N-methylolmethacrylamide propyl ether, acryloyl morpholine, methacryloyl morpholine, N-butoxymethyl acrylamide, N-butoxymethyl methacrylamide, N-vinyl-2-pyrrolidone, and N-vinyl-ε-caprolactam. As the N-substituted (meth)acrylamide of component (B), among these compounds, at least one selected from the group consisting of (meth)acryloyl morpholine, N,N-diethyl (meth)acrylamide, and N-hydroxyethyl (meth)acrylamide is preferable, (meth)acryloyl morpholine is more preferable, and acryloyl morpholine is most preferable. These compounds can be used singly or in combination of two or more kinds thereof.

The blending amount of the N-substituted (meth)acrylamide of component (B) is usually 1 part by mass or more, preferably 3 parts by mass or more, and more preferably 5 parts by mass or more relative to 100 parts by mass of the polyfunctional (meth)acrylate of component (A) from a viewpoint of adhesiveness between the transparent resin film and the first hard coat. At the same time, the blending amount of the N-substituted (meth)acrylamide of component (B) may be usually 100 parts by mass or less, preferably 70 parts by mass or less, more preferably 60 parts by mass or less, still more preferably 50 parts by mass or less, further still more preferably 35 parts by mass or less, and most preferably 15 parts by mass or less from viewpoints of abrasion resistance and suppression of reduction in hardness. The blending amount of the N-substituted (meth) acrylamide of component (B) may be usually 1 part by mass or more and 100 parts by mass or less, and preferably 1 part by mass or more and 70 parts by mass or less, 1 part by mass or more and 60 parts by mass or less, 1 part by mass or more and 50 parts by mass or less, 1 part by mass or more and 35 parts by mass or less, 1 part by mass or more and 15 parts by mass or less, 3 parts by mass or more and 100 parts by mass or less, 3 parts by mass or more and 70 parts by mass or less, 3 parts by mass or more and 60 parts by mass or less, 3 parts by mass or more and 50 parts by mass or less, 3 parts by mass or more and 35 parts by mass or less, 3 parts by mass or more and 15 parts by mass or less, 5 parts by mass or more and 100 parts by mass or less, 5 parts by mass or more and 70 parts by mass or less, 5 parts by mass or more and 60 parts by mass or less, 5 parts by mass or more and 50 parts by mass or less, 5 parts by mass or more and 35 parts by mass or less, or 5 parts by mass or more and 15 parts by mass or less relative to 100 parts by mass of the polyfunctional (meth)acrylate of component (A).

(C) Inorganic Fine Particles Having an Average Particle Diameter of 1 to 300 nm

The inorganic fine particles of component (C) serve to dramatically enhance surface hardness of the hard coat laminated film according to at least one embodiment.

Examples of the inorganic fine particles include silica (silicon dioxide); metal oxide fine particles formed of aluminum oxide, zirconia, titania, zinc oxide, germanium oxide, indium oxide, tin oxide, indium tin oxide, antimony oxide, cerium oxide, or the like; metal fluoride fine particles formed of magnesium fluoride, sodium fluoride, or the like; metal sulfide fine particles; metal nitride fine particles; and metal fine particles.

Among these compounds, fine particles formed of silica or aluminum oxide are preferable, and fine particles formed of silica are more preferable in order to obtain a hard coat having a higher surface hardness. Examples of commercially available silica fine particles include Snowtex (trade name) available from Nissan Chemical Industries, Ltd. and Quartron (trade name) available from Fuso Chemical Co., Ltd.

In order to enhance dispersibility of inorganic fine particles in a coating material or enhance surface hardness of a hard coat obtained, it is preferable to use inorganic fine particles which have been subjected to a surface treatment with a silane coupling agent such as vinylsilane or aminosilane; a titanate coupling agent; an aluminate coupling agent; an organic compound having a reactive functional group such as an ethylenically unsaturated bond group such as a (meth)acryloyl group, a vinyl group, or an allyl group, or an epoxy group; a surface-treatment agent such as a fatty acid or a fatty acid metal salt; or the like.

As the inorganic fine particles of component (C), these compounds can be used singly or in a mixture of two or more kinds thereof.

The average particle diameter of the inorganic fine particles of component (C) is usually 300 nm or less, preferably 200 nm or less, and more preferably 120 nm or less from a viewpoint of obtaining a hardness-improving effect of a hard coat reliably. On the other hand, the lower limit of the average particle diameter of the inorganic fine particles is not particularly specified, but the average particle diameter of inorganic fine particles usually available is about 1 nm at the finest.

Incidentally, here, the average particle diameter of the inorganic fine particles is a particle diameter at which cumulation from a smaller side of the particle diameter becomes 50% by mass in a particle diameter distribution curve measured using a laser diffraction/scattering particle size analyzer "MT3200II" (trade name) available from Nikkiso Co., Ltd.

The blending amount of the inorganic fine particles of component (C) may be usually 5 parts by mass or more, and preferably 20 parts by mass or more relative to 100 parts by mass of the polyfunctional (meth)acrylate of component (A) from a viewpoint of surface hardness in an aspect in which the first hard coat forms a surface of the hard coat laminated film according to at least one embodiment. At the same time, the blending amount of the inorganic fine particles of component (C) may be usually 100 parts by mass or less, and preferably 70 parts by mass or less from a viewpoint of abrasion resistance. The blending amount of the inorganic fine particles in this aspect may be usually 5 parts by mass or more and 100 parts by mass or less, and preferably 5 parts by mass or more and 70 parts by mass or less, 20 parts by mass or more and 100 parts by mass or less, or 20 parts by mass or more and 70 parts by mass or less relative to 100 parts by mass of the polyfunctional (meth)acrylate of component (A).

The blending amount of the inorganic fine particles of component (C) may be preferably 30 parts by mass or more, more preferably 50 parts by mass or more, and still more preferably 80 parts by mass or more relative to 100 parts by mass of component (A) from a viewpoint of surface hardness in an aspect of further forming the second hard coat on a surface layer side of the first hard coat. At the same time, the blending amount of the inorganic fine particles of component (C) may be usually 300 parts by mass or less, preferably 200 parts by mass or less, and more preferably 160 parts by mass or less from a viewpoint of transparency. The blending amount of the inorganic fine particles in this aspect may be usually 30 parts by mass or more and 300 parts by mass or less, preferably 30 parts by mass or more and 200 parts by mass or less, or 30 parts by mass or more and 160 parts by mass or less, preferably 50 parts by mass or more and 300 parts by mass or less, 50 parts by mass or more and 200 parts by mass or less, or 50 parts by mass or more and 160 parts by mass or less, or preferably 80 parts by mass or more and 300 parts by mass or less, 80 parts by mass or more and 200 parts by mass or less, or 80 parts by mass or more and 160 parts by mass or less relative to 100 parts by mass of the polyfunctional (meth)acrylate of component (A).

In any aspect, the blending amount of the inorganic fine particles of component (C) may be typically 5 parts by mass or more and 300 parts by mass or less, 5 parts by mass or more and 200 parts by mass or less, 5 parts by mass or more and 160 parts by mass or less, 5 parts by mass or more and 100 parts by mass or less, 5 parts by mass or more and 70 parts by mass or less, 20 parts by mass or more and 300 parts by mass or less, 20 parts by mass or more and 200 parts by mass or less, 20 parts by mass or more and 160 parts by mass or less, 20 parts by mass or more and 100 parts by mass or less, 20 parts by mass or more and 70 parts by mass or less, 30 parts by mass or more and 300 parts by mass or less, 30 parts by mass or more and 200 parts by mass or less, 30 parts by mass or more and 160 parts by mass or less, 30 parts by mass or more and 100 parts by mass or less, 30 parts by mass or more and 70 parts by mass or less, 50 parts by mass or more and 300 parts by mass or less, 50 parts by mass or more and 200 parts by mass or less, 50 parts by mass or more and 160 parts by mass or less, 50 parts by mass or more and 100 parts by mass or less, 50 parts by mass or more and 70 parts by mass or less, 80 parts by mass or more and 300 parts by mass or less, 80 parts by mass or more and 200 parts by mass or less, 80 parts by mass or more and 160 parts by mass or less, or 80 parts by mass or more and 100 parts by mass or less with respect to 100 parts by mass of the polyfunctional (meth)acrylate of component (A).

(D) Leveling Agent

The first hard coat forming coating material preferably further includes (D) a leveling agent from a viewpoint of improving (smoothing) a surface. This also facilitates formation of the second hard coat in the aspect of forming the second hard coat in the present invention.

Examples of the leveling agent include an acrylic leveling agent, a silicone leveling agent, a fluorine leveling agent, a silicone-acrylate copolymer leveling agent, a fluorine-modified acrylic leveling agent, a fluorine-modified silicone leveling agent, and a leveling agent into which a functional group (for example, an alkoxy group such as a methoxy group or an ethoxy group, an acyloxy group, a halogen group, an amino group, a vinyl group, an epoxy group, a methacryloxy group, an acryloxy group, or an isocyanate group) is introduced. Among these compounds, a silicone-acrylate copolymer leveling agent is preferable as the leveling agent of component (D). As the leveling agent of component (D), these compounds can be used singly or in a mixture of two or more kinds thereof.

The blending amount of the leveling agent of component (D) may be usually 0.01 part by mass or more, preferably 0.1 part by mass or more, and more preferably 0.2 parts by mass or more relative to 100 parts by mass of the polyfunctional (meth)acrylate of component (A) from a viewpoint of smoothing the first hard coat surface. At the same time, the blending amount of the leveling agent of component (D) may be usually 1 part by mass or less, preferably 0.6 parts by mass or less, and more preferably 0.4 parts by mass or less from a viewpoint of satisfactorily applying the second hard coat forming coating material on the first hard coat without being repelled in the aspect of forming the second hard coat in the present invention. The blending amount of the leveling agent of component (D) may be usually 0.01 part by mass or more and 1 part by mass or less, preferably 0.01 part by mass or more and 0.6 parts by mass or less, or 0.01 part by mass or more and 0.4 parts by mass or less, preferably 0.1 part by mass or more and 1 part by mass or less, 0.1 part by mass or more and 0.6 parts by mass or less, or 0.1 part by mass or more and 0.4 parts by mass or less, or preferably 0.2 parts by mass or more and 1 part by mass or less, 0.2 parts by mass or more and 0.6 parts by mass or less, or 0.2 parts by mass or more and 0.4 parts by mass or less.

The first hard coat forming coating material preferably further includes a compound having two or more isocyanate groups (—N=C=O) in one molecule and/or a photopolymerization initiator from a viewpoint of improving curability with an active energy ray.

Examples of the compound having two or more isocyanate groups in one molecule include methylenebis-4-cyclohexylisocyanate; a polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, or a biuret form of hexamethylene diisocyanate; and a urethane crosslinking agent such as blocked isocyanates of the polyisocyanates. As the compound having two or more isocyanate groups in one molecule, these compounds can be used singly or in a mixture of two or more kinds thereof. In crosslinking, a catalyst such as dibutyltin dilaurate or dibutyltin diethylhexoate may be added as necessary.

Examples of the photopolymerization initiator include a benzophenone compound such as benzophenone, methyl-o-benzoyl benzoate, 4-methylbenzophenone, 4,4'-bis(diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl) benzophenone, or 2,4,6-trimethylbenzophenone; a benzoin compound such as benzoin, benzoin methyl ether, benzoin ethyl ether, benzoin isopropyl ether, or benzyl methyl ketal; an acetophenone compound such as acetophenone, 2,2-dimethoxy-2-phenylacetophenone, or 1-hydroxycyclohexyl phenyl ketone; an anthraquinone compound such as methylanthraquinone, 2-ethylanthraquinone, or 2-amylanthraquinone; a thioxanthone compound such as thioxanthone, 2,4-diethylthioxanthone, or 2,4-diisopropylthioxanthone; an alkylphenone compound such as acetophenone dimethyl ketal; a triazine compound; a biimidazole compound; an acylphosphine oxide compound; a titanocene compound; an oxime ester compound; an oxime phenylacetate compound; a hydroxyketone compound; and an aminobenzoate compound. As the photopolymerization initiator, these compounds can be used singly or in a mixture of two or more kinds thereof.

The first hard coat forming coating material can include one or more additives such as an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, organic fine particles, and a colorant, as desired.

The first hard coat forming coating material may include a solvent as desired for dilution to a concentration which allows easy application. The solvent is not particularly limited as long as the solvent neither reacts with any of components (A) to (D) and other optional components nor catalyzes (promotes) a self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, these compounds can be used singly or in a mixture of two or more kinds thereof.

The first hard coat forming coating material can be obtained by mixing and stirring these components.

A method for forming the first hard coat using the first hard coat forming coating material is not particularly limited, but a known web applying method can be used. Examples of the web applying method include roll coating, gravure coating, reverse coating, roll brushing, dip coating, spray coating, spin coating, air knife coating, and die coating.

The thickness of the first hard coat is not particularly limited, but may be usually 1 μm or more, preferably 5 μm or more, more preferably 10 μm or more, and still more preferably 15 μm or more from a viewpoint of surface hardness. In addition, the thickness of the first hard coat may be preferably 100 μm or less, and more preferably 50 μm or less from a viewpoint of cutting processability or a web handling property of the hard coat laminated film according to at least one embodiment. The thickness of the first hard coat may be usually 1 μm or more and 100 μm or less, and preferably 1 μm or more and 50 μm or less, 5 μm or more and 100 μm or less, 5 μm or more and 50 μm or less, 10 μm or more and 100 μm or less, 10 μm or more and 50 μm or less, 15 μm or more and 100 μm or less, or 15 μm or more and 50 μm or less.

The thickness of the first hard coat may be usually 5 μm or more, preferably 10 μm or more, more preferably 15 μm or more, and still more preferably 18 μm or more from a viewpoint of surface hardness in the aspect of forming the second hard coat in the present invention. At the same time, the thickness of the first hard coat may be preferably 35 μm or less, more preferably 30 μm or less, and still more preferably 25 μm or less from a viewpoint of impact resistance. The thickness of the first hard coat may be usually 5 μm or more and 35 μm or less, and preferably 5 μm or more and 30 μm or less, 5 μm or more and 25 μm or less, 10 μm or more and 35 μm or less, 10 μm or more and 30 μm or less, 10 μm or more and 25 μm or less, 15 μm or more and 35 μm or less, 15 μm or more and 30 μm or less, 15 μm or more and 25 μm or less, 18 μm or more and 35 μm or less, 18 μm or more and 30 μm or less, or 18 μm or more and 25 μm or less.

Second Hard Coat

The hard coat laminated film according to at least one embodiment may further include a second hard coat on a surface layer side of the first hard coat. That is, the hard coat laminated film according to at least one embodiment includes, from a surface layer side, the second hard coat, the first hard coat, and the transparent resin film layer. When the hard coat laminated film according to such an aspect is used as a display face plate of an image display apparatus having a touch panel function, the second hard coat usually forms a touch surface of the image display apparatus.

The second hard coat is preferably formed of a coating material containing no inorganic particles. The second hard coat is more preferably formed of a coating material including 100 parts by mass of the (A) polyfunctional (meth) acrylate, (E) 0.01 to 7 parts by mass of a water repelling agent, and (F) 0.01 to 10 parts by mass of a silane coupling agent, and containing no inorganic particles. By using the above coating material as the second hard coat forming coating material, the second hard coat can exhibit good abrasion resistance, and maintain surface characteristics such as finger slidability even after repeated wipes with a handkerchief or the like.

The inorganic particles (for example, silica (silicon dioxide); metal oxide particles formed of aluminum oxide, zirconia, titania, zinc oxide, germanium oxide, indium oxide, tin oxide, indium tin oxide, antimony oxide, cerium oxide, or the like; metal fluoride particles formed of magnesium fluoride, sodium fluoride, or the like; metal sulfide particles; metal nitride particles; and metal particles) are highly effective in enhancing hardness of a hard coat. On the other hand, an interaction between the inorganic particles and a resin component such as the polyfunctional (meth) acrylate of component (A) is weak, resulting in insufficient abrasion resistance. Therefore, the present invention has solved this problem by allowing the second hard coat usually forming an outermost surface to contain no inorganic particles for retaining abrasion resistance, and allowing the first hard coat to preferably contain a specific amount of inorganic particles having an average particle diameter of 1 to 300 nm for enhancing hardness.

Here, "containing no" inorganic particles means not containing a significant amount of inorganic particles. In the field of a hard coat forming coating material, the significant amount of inorganic particles is usually about 1 part by mass or more relative to 100 parts by mass of the polyfunctional (meth)acrylate of component (A). Therefore, "containing no" inorganic particles can be paraphrased as follows. That is, the amount of inorganic particles is usually 0 parts by mass or more, usually less than 1 part by mass, preferably 0.1 part by mass or less, and more preferably 0.01 part by mass or less relative to 100 parts by mass of the polyfunctional (meth)acrylate of component (A).

As the (A) polyfunctional (meth)acrylate for the second hard coat, a polyfunctional (meth)acrylate similar to those described above for the first hard coat forming coating material can be used. As the polyfunctional (meth)acrylate of component (A), these compounds can be used singly or in a mixture of two or more kinds thereof.

(E) Water Repelling Agent

The water repelling agent of component (E) serves to enhance finger slidability, resistance to fouling deposition, and wipeability against fouling.

Examples of the water repelling agent include a wax water repelling agent such as a paraffin wax, a polyethylene wax, or an acrylate-ethylene copolymer wax; a silicone water repelling agent such as a silicone oil, a silicone resin, a polydimethylsiloxane, or an alkylalkoxysilane; and a fluorine-containing water repelling agent such as a fluoropolyether water repelling agent or a fluoropolyalkyl water repelling agent. As the water repelling agent of component (E), these compounds can be used singly or in a mixture of two or more kinds thereof. Among these compounds, a fluoropolyether water repelling agent is preferable as the water repelling agent of component (E) from a viewpoint of water repellency. A water repelling agent including a compound having a (meth)acryloyl group and a fluoropolyether group in a molecule (hereinafter, abbreviated as a (meth) acryloyl group-containing fluoropolyether water repelling agent) is more preferable as component (E) from a viewpoint of preventing a trouble such as bleed-out of the water repelling agent of component (E) because of a chemical bond or a strong interaction between the polyfunctional (meth)acrylate of component (A) and component (E). An admixture of an acryloyl group-containing fluoropolyether water repelling agent and a methacryloyl group-containing fluoropolyether water repelling agent is still more preferable as the water repelling agent of component (E) from a viewpoint of appropriately controlling a chemical bond or an interaction between the polyfunctional (meth)acrylate of component (A) and the water repelling agent of component (E) to exhibit good water repellency while keeping high transparency.

The (meth)acryloyl group-containing fluoropolyether water repelling agent is clearly distinguished from component (A) by the presence or absence of a fluoropolyether group in a molecule. A compound having two or more (meth)acryloyl groups and a fluoropolyether group in one molecule is a (meth)acryloyl group-containing fluoropolyether water repelling agent, which is component (E). That is, a compound having a fluoropolyether group is excluded from definition of the polyfunctional (meth)acrylate of component (A).

The blending amount of the water repelling agent of component (E) is usually 7 parts by mass or less, preferably 4 parts by mass or less, and more preferably 2 parts by mass or less relative to 100 parts by mass of the polyfunctional (meth)acrylate of component (A) from a viewpoint of preventing a trouble such as bleed-out of component (E). At the same time, the blending amount of the water repelling agent of component (E) is usually 0.01 part by mass or more, preferably 0.05 parts by mass or more, and more preferably 0.1 part by mass or more from a viewpoint of obtaining an effect of use of component (E). The blending amount of the water repelling agent may be usually 0.01 part by mass or more and 7 parts by mass or less, preferably 0.01 part by mass or more and 4 parts by mass or less, or 0.01 part by mass or more and 2 parts by mass or less, preferably 0.05 parts by mass or more and 7 parts by mass or less, 0.05 parts by mass or more and 4 parts by mass or less, or 0.05 parts by mass or more and 2 parts by mass or less, or preferably 0.1 part by mass or more and 7 parts by mass or less, 0.1 part by mass or more and 4 parts by mass or less, or 0.1 part by mass or more and 2 parts by mass or less.

(F) Silane Coupling Agent

The silane coupling agent of component (F) servers to enhance adhesiveness between the first hard coat and the second hard coat.

The silane coupling agent is a silane compound having at least two kinds of different reactive groups selected from a hydrolyzable group (for example, an alkoxy group such as a methoxy group or an ethoxy group; an acyloxy group such as an acetoxy group; or a halogen group such as a chloro group) and an organic functional group (for example, an amino group, a mercapto group, a vinyl group, an epoxy group, a methacryloxy group, an acryloxy group, or an isocyanate group). Among these compounds, a silane coupling agent having an amino group (a silane compound having an amino group and a hydrolyzable group) and a silane coupling agent having a mercapto group (a silane compound having a mercapto group and a hydrolyzable group) are preferable as the silane coupling agent of component (F) from a viewpoint of adhesiveness. A silane coupling agent having an amino group is more preferable from a viewpoint of adhesiveness and odor.

Examples of the silane coupling agent having an amino group include N-2-(aminoethyl)-3-aminopropylmethyldimethoxysilane, N-2-(aminoethyl)-3-aminopropyltrim0 ethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

As the silane coupling agent of component (F), these compounds can be used singly or in a mixture of two or more kinds thereof.

The blending amount of the silane coupling agent of component (F) is usually 0.01 part by mass or more, preferably 0.05 parts by mass or more, and more preferably 0.1 part by mass or more relative to 100 parts by mass of the polyfunctional (meth)acrylate of component (A) from a viewpoint of obtaining an adhesiveness-enhancing effect reliably. At the same time, the blending amount of the silane coupling agent of component (F) may be usually 10 parts by mass or less, preferably 5 parts by mass or less, and more preferably 1 part by mass or less from a viewpoint of a pot life of a coating material. The blending amount of the silane coupling agent may be usually 0.01 part by mass or more and 10 parts by mass or less, preferably 0.01 part by mass or more and 5 parts by mass or less, or 0.01 part by mass or more and 1 part by mass or less, preferably 0.05 parts by mass or more and 10 parts by mass or less, 0.05 parts by mass or more and 5 parts by mass or less, or 0.05 parts by mass or more and 1 part by mass or less, or preferably 0.1 part by mass or more and 10 parts by mass or less, 0.1 part by mass or more and 5 parts by mass or less, or 0.1 part by mass or more and 1 part by mass or less.

It should be noted that the blending amount of the silane coupling agent of component (F) in any usual or preferable range referred to herein can be combined with the blending amount of the water repelling agent of component (E) in any usual or preferable range referred to above.

The second hard coat forming coating material preferably further includes a compound having two or more isocyanate groups (—N═C═O) in one molecule and/or a photopolymerization initiator from a viewpoint of improving curability with an active energy ray.

As the compound having two or more isocyanate groups in one molecule for the second hard coat, the same compounds as those described above for the first hard coat forming coating material can be used. As the compound having two or more isocyanate groups in one molecule, these compounds can be used singly or in a mixture of two or more kinds thereof.

As the photopolymerization initiator for the second hard coat, the same compounds as those described above for the first hard coat forming coating material can be used. As the photopolymerization initiator, these compounds can be used singly or in a mixture of two or more kinds thereof.

The second hard coat forming coating material can include one or more additives such as an antistatic agent, a surfactant, a thixotropy-imparting agent, an anti-fouling agent, a printability improver, an antioxidant, a weather resistance stabilizer, a light resistance stabilizer, an ultraviolet absorber, a heat stabilizer, an organic colorant, and organic fine particles, as desired.

The second hard coat forming coating material may include a solvent as desired for dilution to a concentration which allows easy application. The solvent is not particularly limited as long as the solvent neither reacts with any of components (A), (D), and (F), and other optional components nor catalyzes (promotes) a self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, these compounds can be used singly or in a mixture of two or more kinds thereof.

The second hard coat forming coating material can be obtained by mixing and stirring these components.

A method for forming the second hard coat using the second hard coat forming coating material is not particularly limited, but a known web applying method can be used. Examples of the web applying method include roll coating, gravure coating, reverse coating, roll brushing, dip coating, spray coating, spin coating, air knife coating, and die coating.

The thickness of the second hard coat may be preferably 0.5 µm or more, and more preferably 1 µm or more from a viewpoint of abrasion resistance and hardness. At the same time, the thickness of the second hard coat may be preferably 5 µm or less, more preferably 4 µm or less, and still more preferably 3 µm or less from a viewpoint of hardness and adhesiveness to the first hard coat. The thickness of the second hard coat may be preferably 0.5 µm or more and 5

µm or less, and more preferably 0.5 µm or more and 4 µm or less, 0.5 µm or more and 3 µm or less, 1 µm or more and 5 µm or less, 1 µm or more and 4 µm or less, or 1 µm or more and 3 µm or less.

Transparent Resin Film

The transparent resin film can act as a film substrate for forming the first hard coat thereon. According to at least one embodiment, the transparent resin film can act as a film substrate for forming the first hard coat and the second hard coat thereon. In the transparent resin film, at least the first hard coat forming surface is made of a poly(meth)acrylimide resin.

The poly(meth)acrylimide resin is a polymer in which an imide structure is introduced into an acrylic resin. The poly(meth)acrylimide resin is a thermoplastic resin obtained by introducing characteristics of excellent heat resistance and excellent dimensional stability derived from a polyimide resin and overcoming a drawback of being colored from pale yellow to reddish brown while high transparency, high surface hardness, and high rigidity derived from an acrylic resin are retained. A method for producing the poly(meth)acrylimide resin is not particularly limited, but examples thereof include a method for introducing an imide structure by a reaction of an acrylic resin with an imidizing agent.

Examples of the acrylic resin for producing the poly(meth)acrylimide resin include a (meth)acrylate (co)polymer and a copolymer including a structural unit derived from a (meth)acrylate. The term (meth)acrylic herein means acrylic or methacrylic. In addition, the term (co)polymer herein means a polymer or a copolymer.

Examples of the (meth)acrylate (co)polymer include polymethyl (meth)acrylate, polyethyl (meth)acrylate, polypropyl (meth)acrylate, polybutyl (meth)acrylate, a methyl (meth)acrylate-butyl (meth)acrylate copolymer, and an ethyl (meth)acrylate-butyl (meth)acrylate copolymer.

Examples of the copolymer including a structural unit derived from a (meth)acrylate include an ethylene-methyl (meth)acrylate copolymer, a styrene-methyl (meth)acrylate copolymer, a vinyl cyclohexane-methyl (meth)acrylate copolymer, a maleic anhydride-methyl (meth)acrylate copolymer, and an N-substituted maleimide-methyl (meth)acrylate copolymer.

Examples of the imidizing agent for producing the poly(meth)acrylimide resin include methylamine, cyclohexylamine, and ammonia.

The poly(meth)acrylimide resin has a high potential as a resin for a film substrate of a hard coat laminated film. However, adhesion strength with a hard coat is insufficient, and an adhesion-facilitating treatment such as an extremely strong corona discharge treatment or special anchor coat has been required (see JP 2015-034285 A). Particularly in a case where the poly(meth)acrylimide resin forms both surfaces of a film substrate, when the hard coat is formed on both surfaces thereof, adhesion strength of the hard coat tends to be insufficient disadvantageously. Without wishing to be bound by any theory, it is considered that the poly(meth)acrylimide resin lowers adhesiveness to the hard coat by irradiation with an active energy ray.

When the first hard coat forming coating material includes a preferable amount of the N-substituted (meth)acrylamide compound of component (B), the hard coat laminated film according to at least one embodiment can exhibit a sufficient adhesion force even when the first hard coat is directly formed on the first hard coat forming surface (poly(meth)acrylimide resin) of the transparent resin film. That is, even when the first hard coat forming surface (poly(meth)acrylimide resin) of the transparent resin film is not subjected to an adhesion-facilitating treatment such as a corona discharge treatment or anchor coat formation, the hard coat laminated film according to at least one embodiment can exhibit a sufficient adhesion force.

The transparent resin film may be a transparent monolayer film made of a poly(meth)acrylimide resin. In the transparent resin film, a layer forming the first hard coat forming surface is made of a poly(meth)acrylimide resin, and the transparent resin film may be a transparent multilayer film having one or more other layers made of any type of resin. The transparent resin film may be preferably a transparent multilayer film obtained by laminating ($\alpha$1) a first poly(meth)acrylimide resin layer; ($\beta$) an aromatic polycarbonate resin layer; and ($\alpha$2) a second poly(meth)acrylimide resin layer, directly in this order. Incidentally, the present invention will be described assuming that a touch surface of an image display apparatus having a touch panel function is formed on the $\alpha$1 layer side when the hard coat laminated film is used as a member of the image display apparatus.

The poly(meth)acrylimide resin is excellent in heat resistance and surface hardness, but tends to have insufficient cutting processability. On the other hand, the aromatic polycarbonate resin has excellent cutting processability, but often has insufficient heat resistance and surface hardness. Therefore, use of the transparent multilayer film having the above layer configuration makes it possible to easily obtain a hard coat laminated film that is excellent in all of heat resistance, surface hardness, and cutting processability by compensating for drawbacks of the two resins.

The layer thickness of the $\alpha$1 layer is not particularly limited, but may be usually 20 µm or more, preferably 40 µm or more, more preferably 60 µm or more, and still more preferably 80 µm or more from a viewpoint of heat resistance and surface hardness of the hard coat laminated film according to at least one embodiment.

The layer thickness of the $\alpha$2 layer is not particularly limited, but is preferably the same layer thickness as the $\alpha$1 layer from a viewpoint of curling resistance of the hard coat laminated film according to at least one embodiment.

"The same layer thickness" referred to herein should not be interpreted to be the same layer thickness in a physico-chemically strict sense of the word. It should be interpreted to be the same layer thickness within a variation in a process/quality control usually performed industrially. The reason is that curling resistance of a multilayer film can be kept good when the layer thicknesses are the same within a variation in a process/quality control usually performed industrially. An unstretched multilayer film obtained by a T-die co-extrusion method is usually subjected to a process/quality control within a variation of about −5 to +5 µm, and therefore the layer thickness of 65 µm and the layer thickness of 75 µm should be interpreted to be identical. "The same layer thickness" here can be paraphrased as "substantially the same layer thickness".

The layer thickness of the $\beta$ layer is not particularly limited, but may be usually 20 µm or more, and preferably 80 µm or more from a viewpoint of cutting processability of the hard coat laminated film according to at least one embodiment.

The poly(meth)acrylimide resin used for the $\alpha$1 layer and the $\alpha$2 layer is not limited as long as having high transparency and exhibiting no coloration for the purpose of using the hard coat laminated film for an optical article such as a touch panel, and any poly(meth)acrylimide resin can be used.

Preferable examples of the poly(meth)acrylimide resin include a poly(meth)acrylimide resin having a yellowness index (measured using a colorimeter "SolidSpec-3700" (trade name) available from Shimadzu Corporation in accordance with JIS K7105:1981) of 3 or less. The yellowness index of the poly(meth)acrylimide resin is more preferably 2 or less, and still more preferably 1 or less. In addition, preferable examples of the poly(meth)acrylimide resin include a poly(meth)acrylimide resin having a melt mass flow rate (measured according to ISO 1133 under conditions of 260° C. and 98.07 N) of 0.1 to 20 g/10 min from a viewpoint of an extrusion load and stability of a melted film. The melt mass flow rate of the poly(meth)acrylimide resin is more preferably from 0.5 to 10 g/10 min. Furthermore, the glass transition temperature of the poly(meth)acrylimide resin is preferably 150° C. or higher from a viewpoint of heat resistance. The glass transition temperature is more preferably 170° C. or higher.

The poly(meth)acrylimide resin may preferably have a yellowness index of 3 or less, 2 or less, or 1 or less, a melt mass flow rate of 0.1 to 20 g/10 min or 0.5 to 10 g/10 min, and a glass transition temperature of 150° C. or higher or 170° C. or higher.

The poly(meth)acrylimide resin can further include, within a range not contrary to an object of the various embodiments, a thermoplastic resin other than a poly(meth)acrylimide resin; a pigment, an inorganic filler, an organic filler, and a resin filler; an additive such as a lubricant, an antioxidant, a weather resistance stabilizer, a heat stabilizer, a releasing agent, an antistatic agent, or a surfactant; or the like, as desired. The blending amount of the optional component(s) is usually about from 0.01 to 10 parts by mass relative to 100 parts by mass of the poly(meth)acrylimide resin.

Commercially available examples of the poly(meth)acrylimide resin include "PLEXIMID TT50" (trade name) "and PLEXIMID TT70" (trade name) available from Evonik Degussa GmbH.

For the poly(meth)acrylimide resin used for the α1 layer and the poly(meth)acrylimide resin used for the α2 layer, poly(meth)acrylimide resins having different resin characteristics, for example, having different melt mass flow rates or glass transition temperatures may be used. Poly(meth)acrylimide resins having the same resin characteristics are preferably used for the a1 layer and the α2 layer from a viewpoint of curling resistance of the hard coat laminated film according to at least one embodiment. Use of the poly(meth)acrylimide resins in the same grade and in the same lot is one of preferable embodiments, for example.

As the aromatic polycarbonate resin used for the β layer, for example, it is possible to use one kind or a mixture of two or more kinds of aromatic polycarbonate resins such as a polymer obtained by an interfacial polymerization method for an aromatic dihydroxy compound such as bisphenol A, dimethyl bisphenol A, or 1,1-bis(4-hydroxyphenyl)-3,3,5-trimethylcyclohexane and phosgene; and a polymer obtained by a transesterification reaction between an aromatic dihydroxy compound such as bisphenol A, dimethyl bisphenol A, or 1,1-bis(4-hydroxyphenyl)-3,3,5-trimethylcyclohexane and a carbonate diester such as diphenyl carbonate.

Preferable examples of optional components which can be contained in the aromatic polycarbonate resin include a core-shell rubber. By using the core-shell rubber in an amount of 0 to 30 parts by mass (100 to 70 parts by mass of the aromatic polycarbonate resin), preferably in an amount of 0 to 10 parts by mass (100 to 90 parts by mass of the aromatic polycarbonate resin) relative to 100 parts by mass of the total amount of the aromatic polycarbonate resin and the core-shell rubber, cutting processability and impact resistance of the hard coat laminated film can be further enhanced.

Examples of the core-shell rubber include core-shell rubbers each formed of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. As the core-shell rubber, these compounds can be used singly or in a mixture of two or more kinds thereof.

The aromatic polycarbonate resin can further include, within a range not contrary to an object of the various embodiments, a thermoplastic resin other than an aromatic polycarbonate resin and a core-shell rubber; a pigment, an inorganic filler, an organic filler, and a resin filler; an additive such as a lubricant, an antioxidant, a weather resistance stabilizer, a heat stabilizer, a release agent, an antistatic agent, or a surfactant; or the like, as desired. The blending amount of the optional component(s) is usually about from 0.01 to 10 parts by mass relative to 100 parts by mass of the total amount of the aromatic polycarbonate resin and the core-shell rubber.

A method for producing the transparent resin film is not particularly limited. Preferable examples of the production method include methods described in JP 2015-033844 A and JP 2015-034285 A.

The thickness of the transparent resin film (monolayer or multilayer) is not particularly limited, but can be any thickness as desired. The thickness of the transparent resin film may be usually 20 μm or more, preferably 40 μm or more, and still more preferably 60 μm or more from a viewpoint of handleability of the hard coat laminated film according to at least one embodiment. When the hard coat laminated film according to at least one embodiment is used for an application not requiring high rigidity, the thickness of the transparent resin film may be usually 250 μm or less, and preferably 150 μm or less from a viewpoint of economic efficiency. Therefore, in such an application, the thickness of the transparent resin film may be preferably 20 μm or more and 250 μm or less, 20 μm or more and 150 μm or less, 40 μm or more and 250 μm or less, 40 μm or more and 150 μm or less, 60 μm or more and 250 μm or less, or 60 μm or more and 150 μm or less.

When the hard coat laminated film according to at least one embodiment is used for an application requiring high rigidity, such as a display face plate, the thickness of the transparent resin film may be usually 100 μm or more, preferably 200 μm or more, and more preferably 300 μm or more. In addition, the thickness of the transparent resin film may be usually 1500 μm or less, preferably 1200 μm or less, and more preferably 1000 μm or less from a viewpoint of meeting a requirement for a thinner apparatus. Therefore, in such an application, the thickness of the transparent resin film may be preferably 100 μm or more and 1500 μm or less, 100 μm or more and 1200 μm or less, 100 μm or more and 1000 μm or less, 200 μm or more and 1500 μm or less, 200 μm or more and 1200 μm or less, 200 μm or more and 1000 μm or less, 300 μm or more and 1500 μm or less, 300 μm or more and 1200 μm or less, or 300 μm or more and 1000 μm or less.

It should be noted that the thickness of the transparent resin film in any preferable range referred to herein can be combined with the thickness(es) of the first hard coat and/or the second hard coat in any preferable range referred to above.

Incidentally, as described above, in the preferable hard coat laminated film according to at least one embodiment, it is not necessary to subject the first hard coat forming surface or both surfaces of the transparent resin film to an adhesion-facilitating treatment such as a corona discharge treatment or anchor coat formation in advance in order to increase adhesion strength with the first hard coat. However, it is not intended to exclude performing the adhesion-facilitating treatment. That is, in the hard coat laminated film according to at least one embodiment, the first hard coat forming surface or both surfaces of the transparent resin film may be subjected to an adhesion-facilitating treatment. By subjecting the first hard coat forming surface or both surfaces of the transparent resin film to an adhesion-facilitating treatment, it can be expected that adhesiveness between the transparent resin film and the first hard coat is further improved and adhesiveness is maintained even when the hard coat laminated film according to at least one embodiment is exposed to an unexpected use environment.

The hard coat laminated film according to at least one embodiment preferably further includes a third hard coat on a surface of the transparent resin film, opposite to the first hard coat forming surface. Formation of the third hard coat allows a force to curl the hard coat laminated film in one direction (hereinafter, also abbreviated as a curling force) and a force to curl the hard coat laminated film in another direction to work simultaneously. By allowing these two curling forces to be canceled to be zero, occurrence of curling can be suppressed. The third hard coat forming coating material and the thickness of the third hard coat are not particularly limited as long as the two curling forces can be canceled. According to an aspect of forming the second hard coat, the third hard coat forming coating material and the thickness of the third hard coat may be those described above for the first hard coat, for example.

In recent years, a touch panel having a bilayer structure in which a touch sensor is directly formed on a back side of a display face plate for the purpose of weight reduction of an image display apparatus (so-called one-glass-solution) has been proposed. In addition, one-plastic-solution substituted for the so-called one-glass-solution has been also proposed for the purpose of further weight reduction. When the hard coat laminated film according to at least one embodiment is used for the one-plastic-solution substituted for the so-called one-glass-solution, formation of the third hard coat can easily impart properties suitable as a printed surface thereto.

FIG. 1 is a conceptual cross-sectional view exemplifying the hard coat laminated film according to at least one embodiment. This exemplary hard coat laminated film includes, from a surface layer side, a second hard coat 1, a first hard coat 2, (α1) a first poly(meth)acrylimide resin layer 3, (β) an aromatic polycarbonate resin layer 4, (α2) a second poly(meth)acrylimide resin layer 5, and a third hard coat 6.

The hard coat laminated film according to at least one embodiment may include an optional layer(s) other than the first hard coat, the second hard coat, the transparent resin film layer, and the third hard coat, as desired. Examples of the optional layer include a hard coat other than the first to third hard coats, an anchor coat, a pressure-sensitive adhesive agent layer, a transparent conductive layer, a high refractive index layer, a low refractive index layer, and a reflection-preventive layer.

The hard coat laminated film according to at least one embodiment has a total light transmittance of preferably 85% or more, more preferably 88% or more, still more preferably 90% or more (measured using a turbidimeter "NDH 2000" (trade name) available from Nippon Denshoku Industries Co., Ltd. in accordance with JIS K7361-1:1997). Because of the total light transmittance of 85% or more, the hard coat laminated film according to at least one embodiment can be suitably used as a member of an image display apparatus. A higher total light transmittance is more preferable.

The hard coat laminated film according to at least one embodiment has a haze (measured using a turbidimeter "NDH 2000" (trade name) available from Nippon Denshoku Industries Co., Ltd. in accordance with JIS K7136:2000) of preferably 5% or less, more preferably 4% or less.

The hard coat laminated film according to at least one embodiment has a yellowness index (measured using a colorimeter "SolidSpec-3700" (trade name) available from Shimadzu Corporation in accordance with JIS K7105:1981) of preferably 3 or less, more preferably 2 or less, still more preferably 1 or less.

The hard coat laminated film according to at least one embodiment has a minimum bending radius of preferably 70 mm or less, more preferably 50 mm or less, still more preferably 40 mm or less. Because of the minimum bending radius of 70 mm or less, the hard coat laminated film according to at least one embodiment can be easily handled as a film roll, and is advantageous in terms of production efficiency or the like. Here, the minimum bending radius is a value measured according to a test (x) in Examples described below.

In the hard coat laminated film according to at least one embodiment, the first hard coat side surface has a pencil hardness (measured using a pencil "UNI" (trade name) available from Mitsubishi Pencil Co., Ltd. under a condition of a load of 750 g in accordance with JIS K5600-5-4) of preferably 4H or more, more preferably 5H or more, still more preferably 6H or more, further still more preferably 7H or more. Because of the pencil hardness of 4H or more, the hard coat laminated film according to at least one embodiment can be suitably used as a member of an image display apparatus. Higher pencil hardness is more preferable.

According to JIS K5600-5-6:1999, a square lattice pattern cut consisting of 100 cells (1 cell=1 mm×1 mm) is formed from a first hard coat side surface of a hard coat laminated film. Thereafter, a tape for an adhesion test is pasted on the square lattice pattern, is rubbed with fingers, and is then peeled off. At this time, the hard coat laminated film according to at least one embodiment has adhesiveness usually in classification of 3, 2, 1, or 0, preferably in classification of 2, 1, or 0, more preferably in classification of 1 or 0, still more preferably in classification of 0 in the criteria for determination described in Table 1 in the standard of JIS while the highest rank is set to 0 (zero).

In the hard coat laminated film according to at least one embodiment, the first hard coat side surface has a water contact angle of preferably 100° or more, more preferably 105° or more. When the hard coat laminated film according to at least one embodiment is used as a display face plate of a touch panel, the first hard coat side surface forms a touch surface. The water contact angle at the first hard coat side surface of 100° or more makes it possible to operate a touch panel by sliding a finger or a pen on a touch surface according to one's own will. The upper limit of the water contact angle is not particularly specified, but about 120° is usually sufficient from a viewpoint of sliding a finger or a pen according to one's own will. Here, the water contact angle is a value measured according to a test (vi) in Examples described below.

In the hard coat laminated film according to at least one embodiment, the water contact angle at the first hard coat side surface after 20,000 reciprocating wipes with a cotton is 100° or more. More preferably, the water contact angle after 25,000 reciprocating wipes with a cotton is 100° or more. The water contact angle after 20,000 reciprocating wipes with a cotton of 100° or more makes it possible to maintain surface characteristics such as finger slidability even after repeated wipes with a handkerchief or the like. For the number of wipes with a cotton during which a water contact angle of 100° or more can be maintained, a larger number is more preferable. Here, the water contact angle after wipes with a cotton is a value measured according to a test (vii) in Examples described below.

In the hard coat laminated film according to at least one embodiment, preferably, the total light transmittance may be 85% or more, 88% or more, or 90% or more, the haze may be 5% or less, or 4% or less, the yellowness index may be 3 or less, 2 or less, or 1 or less, the minimum bending radius may be 70 mm or less, 50 mm or less, or 40 mm or less, the pencil hardness on the first hard coat side surface may be 4H or more, 5H or more, 6H or more, or 7H or more, the adhesiveness according to the above criteria may be in classification 3 or less, classification 2 or less, classification 1 or less, or classification 0, the water contact angle at the first hard coat side surface may be 100° or more, or 105° or more, and the water contact angle on the first hard coat side surface after 20,000 reciprocating wipes with a cotton may be 100° or more or the water contact angle on the first hard coat side surface after 25,000 reciprocating wipes with a cotton may be 100° or more. That is, any combination of the ranges of these parameters (any "combination" as a mathematical term) may be preferable.

Producing Method

A method for producing the hard coat laminated film according to at least one embodiment is not particularly limited, but any method can be used. When the hard coat laminated film according to at least one embodiment includes, from a surface layer side, a second hard coat, a first hard coat, and a transparent resin film layer, a preferable example of producing method, from a viewpoint of adhesiveness between the first hard coat and the second hard coat, includes:

(1) a step of forming a wet coat of the first hard coat forming coating material on the transparent resin film;

(2) a step of irradiating the wet coat of the first hard coat forming coating material with an active energy ray at an integrated amount of light of 1 to 230 mJ/cm$^2$, preferably 5 to 200 mJ/cm$^2$, more preferably 10 to 160 mJ/cm$^2$, still more preferably 20 to 120 mJ/cm$^2$, most preferably 30 to 100 mJ/cm$^2$, and converting the wet coat of the first hard coat forming coating material into a coat in a set-to-touch state;

(3) a step of forming a wet coat of the second hard coat forming coating material on the coat of the first hard coat forming coating material in a set-to-touch state; and (4) a step of preheating the wet coat of the second hard coat forming coating material to a temperature of 30 to 100° C., preferably 40 to 85° C., more preferably 50 to 75° C., and irradiating the wet coat with an active energy ray at an integrated amount of light of 240 to 10000 mJ/cm$^2$, preferably 320 to 5000 mJ/cm$^2$, more preferably 360 to 2000 mJ/cm$^2$.

In the step (1), the method for forming the wet coat of the first hard coat forming coating material is not particularly limited, but a known web applying method can be used. Examples of the web applying method include roll coating, gravure coating, reverse coating, roll brushing, dip coating, spray coating, spin coating, air knife coating, and die coating.

The wet coat of the first hard coat forming coating material formed in the step (1) is in a set-to-touch state or in a state with no tackiness in the step (2), causing no problem in handling such as sticking even in direct contact with a web apparatus. Therefore, in the subsequent step (3), a wet coat of the second hard coat forming coating material can be formed on the coat of the first hard coat forming coating material in a set-to-touch state.

It should be noted that the clause "a coat is in a set-to-touch state (in a state with no tackiness)" herein means that a coat is in a state causing no problem in handling even in direct contact with a web apparatus.

Irradiation with an active energy ray in the step (2) is performed such that the integrated amount of light is usually 1 mJ/cm$^2$ or more, preferably 5 mJ/cm$^2$ or more, more preferably 10 mJ/cm$^2$ or more, still more preferably 20 mJ/cm$^2$ or more, and most preferably 30 mJ/cm$^2$ or more from a viewpoint of converting the coat into a coat in a set-to-touch state reliably, although depending on characteristics of the first hard coat forming coating material. At the same time, the irradiation may be performed such that the integrated amount of light is usually 230 mJ/cm$^2$ or less, preferably 200 mJ/cm$^2$ or less, more preferably 160 mJ/cm$^2$ or less, still more preferably 120 mJ/cm$^2$ or less, and most preferably 100 mJ/cm$^2$ or less from a viewpoint of adhesiveness between the first hard coat and the second hard coat.

The wet coat of the first hard coat forming coating material is preferably predried before irradiation with an active energy ray in the step (2). Predrying described above can be performed by allowing a web to pass through a drying furnace set at a temperature of about 23 to 150° C., preferably 50 to 120° C., at a line speed such that the time required to pass from the inlet to the outlet is about from 0.5 to 10 minutes and preferably from 1 to 5 minutes, for example.

When the irradiation with an active energy ray is performed in the step (2), the wet coat of the first hard coat forming coating material may be preheated to a temperature of 40 to 120° C., preferably 70 to 100° C. This can convert the coat into a coat in a set-to-touch state reliably. A method for preheating described above is not particularly limited, but any method can be used. Specific examples of the method for preheating will be described below in the description of the step (4).

In the step (3), a method for forming the wet coat of the second hard coat forming coating material is not particularly limited, but a known web applying method can be used. Examples of the web applying method include roll coating, gravure coating, reverse coating, roll brushing, dip coating, spray coating, spin coating, air knife coating, and die coating.

The wet coat of the second hard coat forming coating material formed in the step (3) is completely cured in the step (4). At the same time, the coat of the first hard coat forming coating material is also completely cured.

The above method can enhance adhesiveness between the first hard coat and the second hard coat, and without wishing to be bound by any theory it is presumed that the reason is that complete curing is simultaneously achieved for both the hard coats by limiting the integrated amount of light in irradiation with an active energy ray to an amount adequate to convert the coat into a coat in a set-to-touch state but inadequate to completely cure the coat in the step (2) and setting the integrated amount of light to an amount adequate to completely cure the coat in the step (4) for the first time.

The irradiation with an active energy ray in the step (4) is performed such that the integrated amount of light is 240 mJ/cm$^2$ or more, preferably 320 mJ/cm$^2$ or more, and more preferably 360 mJ/cm$^2$ or more from a viewpoint of completely curing the coat and adhesiveness between the first hard coat and the second hard coat. At the same time, the irradiation with an active energy ray is performed such that the integrated amount of light is 10000 mJ/cm$^2$ or less, preferably 5000 mJ/cm$^2$ or less, and more preferably 2000 mJ/cm$^2$ or less from a viewpoint of preventing yellowing of a hard coat laminated film obtained and cost.

The wet coat of the second hard coat forming coating material is preferably predried before irradiation with an active energy ray in the step (4). Predrying described above can be performed by allowing a web to pass through a drying furnace set at a temperature of about 23 to 150° C., preferably 50 to 120° C., at a line speed such that the time required to pass from the inlet to the outlet is about from 0.5 to 10 minutes and preferably from 1 to 5 minutes, for example.

Figure 3:
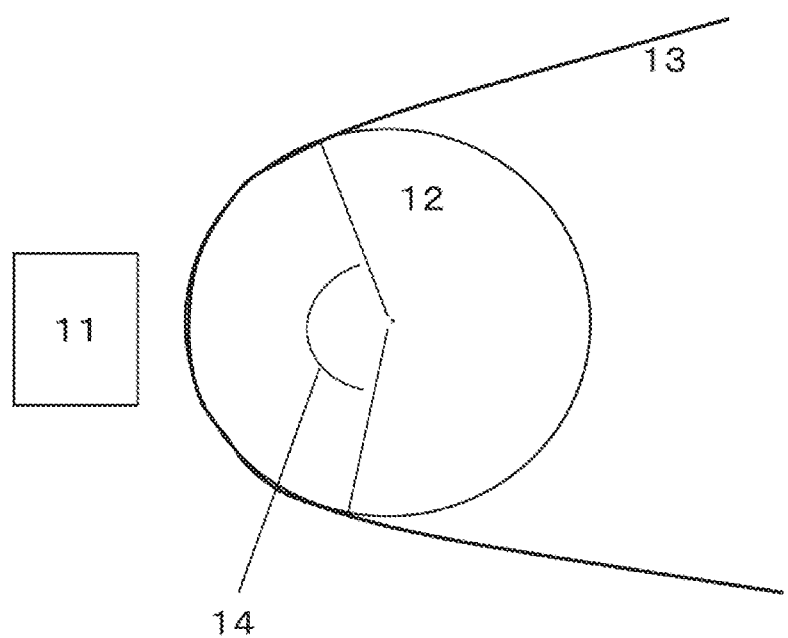
FIG. 3 is a conceptual diagram of an ultraviolet irradiator used in Examples.

When the irradiation with an active energy ray is performed in the step (4), the wet coat of the second hard coat forming coating material may be preheated to a temperature of 30 to 100° C., preferably 40 to 85° C., more preferably 50 to 75° C. from a viewpoint of obtaining a good interlayer adhesion strength even when the first hard coat forming coating material and the second hard coat forming coating material have largely different characteristics from each other. A method for preheating described above is not particularly limited, but any method can be used. Examples thereof include a method in which a web 13 is held by a mirror-finished metal roll 12 disposed opposite to an active energy ray (ultraviolet ray) irradiator 11 as illustrated in FIG. 3 and a surface temperature of the roll 12 is controlled to a predetermined temperature; a method in which a temperature in an irradiation furnace surrounding an active energy ray irradiator is controlled to a predetermined temperature; and a combination of these methods.

An aging treatment may be performed after the step (4). The aging treatment can stabilize characteristics of the hard coat laminated film.

Article Including the Hard Coat Laminated Film According to at Least One Embodiment An article including the hard coat laminated film according to at least one embodiment is not particularly limited, but examples thereof include an image display apparatus such as a liquid crystal display, a plasma display, or an electroluminescence display (including an image display apparatus having a touch panel function and an image display apparatus having no touch panel function), particularly an image display apparatus having a touch panel function.

The article including the hard coat laminated film according to at least one embodiment is not particularly limited, but examples thereof include a window, a door, or the like for a building; a television, a personal computer, a tablet type information device, a smartphone, and housings and display surface plates thereof; a refrigerator, a washing machine, a cupboard, a wardrobe, and panels constituting these; a vehicle, a window of a vehicle, a windshield, a roof window, an instrument panel, or the like; an electronic signboard and a protective plate thereof; and a show window.

In producing an article using the hard coat laminated film according to at least one embodiment, in order to impart high designability to an obtained article, a decorative sheet may be laminated on a surface of the transparent resin film, opposite to the first hard coat forming surface. Such an embodiment is particularly effective when the hard coat laminated film according to at least one embodiment is used as a front panel of a door body for opening and closing a front portion of a main body of an article such as a refrigerator, a washing machine, a cupboard, or a wardrobe, or a flat panel of a lid body for opening and closing a flat portion of the main body. The decorative sheet is not limited, but any decorative sheet can be used. As the decorative sheet, for example, any colored resin sheet can be used.

The colored resin sheet is not particularly limited, but examples thereof include a polyester resin such as an aromatic polyester or an aliphatic polyester; an acrylic resin; a polycarbonate resin; a poly(meth)acrylimide resin; a polyolefin resin such as polyethylene, polypropylene, or polymethylpentene; a cellulose resin such as cellophane, triacetylcellulose, diacetylcellulose, or acetylcellulose butyrate; a styrene resin such as polystyrene, an acrylonitrile-butadiene-styrene copolymer resin (ABS resin), a styrene-ethylene-propylene-styrene copolymer, a styrene-ethylene-ethylene-propylene-styrene copolymer, or a styrene-ethylene-butadiene-styrene copolymer; a polyvinyl chloride resin; a polyvinylidene chloride resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, and polyethersulfone. These sheets include an unstretched sheet, a uniaxially stretched sheet, and a biaxially stretched sheet. These sheets also include a laminated sheet obtained by laminating two or more layers of one or more kinds thereof.

The thickness of the colored resin sheet is not particularly limited, but may be usually 20 μm or more, preferably 50 μm or more, and more preferably 80 μm or more. In addition, the thickness of the colored resin sheet may be usually 1500 μm or less, preferably 800 μm or less, and more preferably 400 μm or less from a viewpoint of meeting a requirement for a thinner article.

A printed layer may be provided on an outer surface of the colored resin sheet, if desired, in order to enhance the sense of design. The printed layer can be provided in order to impart high designability. The printed layer can be formed by printing any pattern using any ink and any printing machine.

Printing can be performed directly or via an anchor coat entirely or partially on a surface of the transparent resin film, opposite to the first hard coat forming surface thereof and/or on an outer surface of the colored resin sheet. Examples of the pattern include a metal-like pattern such as hair lines, a grain pattern, a stone mesh pattern imitating a surface of a rock such as marble, a fabric pattern imitating texture or a cloth-like pattern, a tile stitch pattern, a brickwork pattern, a parquet pattern, and a patchwork. As the printing ink, an ink obtained by appropriately mixing a pigment, a solvent, a stabilizer, a plasticizer, a catalyst, a curing agent, and the like with a binder can be used. Examples of the binder include a resin such as a polyurethane resin, a vinyl chloride-vinyl acetate copolymer resin, a vinyl chloride-vinyl acetate-acrylate copolymer resin, a chlorinated polypropylene resin, an acrylic resin, a polyester resin, a polyamide resin, a butyral resin, a polystyrene resin, a nitrocellulose resin, or a cellulose acetate resin, and a resin composition thereof. In addition, in order to provide a metal-like design, aluminum, tin, titanium, indium, an oxide thereof, or the like may be vapor-deposited directly or via an anchor coat entirely or partially on a surface of the transparent resin film, opposite to the first hard coat forming surface thereof and/or on an outer surface of the colored resin sheet by a known method.

Lamination of the transparent resin film and the decorative sheet is not particularly limited, but can be performed by any method. Examples of the method include a dry lamination method using a known adhesive agent and a method for forming a layer of a known pressure-sensitive adhesive agent and then superimposing and pressing the above two.

EXAMPLES

Hereinafter, the present invention will be described with reference to Examples, but the present invention is not limited thereto.

Measurement and Evaluation Method (i) Total Light Transmittance

The total light transmittance of a hard coat laminated film was measured using a turbidimeter "NDH2000" (trade name) available from Nippon Denshoku Industries Co., Ltd. in accordance with JIS K7361-1:1997.

(ii) Haze

The haze of a first hard coat side surface of a hard coat laminated film was measured using a turbidimeter "NDH2000" (trade name) available from Nippon Denshoku Industries Co., Ltd. in accordance with JIS K7136:2000.

(iii) Pencil Hardness

The pencil hardness of a first hard coat side surface of a hard coat laminated film was measured using a pencil "UNI" (trade name) available from Mitsubishi Pencil Co., Ltd under a condition of a load of 750 g in accordance with JIS K5600-5-4.

(iv) Yellowness Index

The yellowness index of a hard coat laminated film was measured using a colorimeter "SolidSpec-3700" (trade name) available from Shimadzu Corporation in accordance with JIS K7105:1981.

(v) Square Lattice Pattern Test (Adhesiveness)

In accordance with JIS K5600-5-6:1999, a square lattice pattern cut consisting of 100 cells (1 cell=1 mm×1 mm) was formed on a hard coat laminated film from a first hard coat side surface. Thereafter, a tape for an adhesion test was pasted on the square lattice pattern, was rubbed with fingers, and was then peeled off. The criteria for evaluation were in accordance with Table 1 in the above standard of JIS.

Classification 0: Edges of the cuts were completely smooth, and none of the squares of the lattice was peeled off.

Classification 1: Small peeling of a coat was observed at intersections of the cuts. A cross-cut area of clearly not more than 5% was affected.

Classification 2: A coat was peeled off along edges and/or at intersections of the cuts. A cross-cut area of clearly more than 5% but not more than 15% was affected.

Classification 3: A coat was largely peeled off along edges of the cuts partially or entirely, and/or various parts of squares were peeled off partially or entirely. A cross-cut area of clearly more than 15% but not more than 35% was affected.

Classification 4: A coat was largely peeled off along edges of the cuts partially or entirely, and/or some parts of squares were peeled off partially or entirely. A cross-cut area of clearly more than 35% but not more than 65% was affected.

Classification 5: A case where the degree of peeling was more than that in Classification 4.

(vi) Water Contact Angle (Initial Water Contact Angle)

The water contact angle at a first hard coat side surface of a hard coat laminated film was measured by a method for calculating the water contact angle from a width and a height of a water droplet (see JIS R3257:1999) using an automatic contact angle meter "DSA20" (trade name) available from KRUSS GmbH.

(vii) Abrasion Resistance 1 (Water Contact Angle after Wipes with a Cotton)

A test piece was taken such that the size thereof was 150 mm in length and 50 mm in width and the machine direction of a hard coat laminated film was in the longitudinal direction of the test piece. This test piece was placed on a Gakushin tester according to JIS L0849:2013 such that a first hard coat side surface of the hard coat laminated film was a front side. A stainless steel plate (10 mm in length, 10 mm in width, 1 mm in thickness) covered with a four-stacked-sheet gauze (medical type 1 gauze available from Kawamoto Corp.) was attached to a friction terminal of the Gakushin tester such that the length and width surface of the stainless steel plate was brought into contact with the test piece. A load of 350 g was placed on the stainless steel plate covered with the gauze. The first hard coat side surface of the test piece was rubbed reciprocatingly 10,000 times under conditions of a moving distance of the friction terminal of 60 mm and a speed of one reciprocation/sec. Thereafter, the water contact angle of the cotton-wiped portion was measured according to the method of the (vi). When the water contact angle was 100° or more, an operation of additionally performing 5,000 reciprocating rubs and then measuring the water contact angle of the cotton-wiped portion in accordance with the method of the (vi) was repeated, and evaluation was performed according to the following criteria.

A: The water contact angle was 100° or more even after 25,000 reciprocating rubs.

B: The water contact angle was 100° or more after 20,000 reciprocating rubs, but the water contact angle was less than 100° after 25,000 reciprocating rubs.

C: The water contact angle was 100° or more after 15,000 reciprocating rubs, but the water contact angle was less than 100° after 20,000 reciprocating rubs.

D: The water contact angle was 100° or more after 10,000 reciprocating rubs, but the water contact angle was less than 100° after 15,000 reciprocating rubs.

E: The water contact angle was less than 100° after 10,000 reciprocating rubs.

(viii) Abrasion Resistance 2 (Steel Wool Resistance)

A hard coat laminated film was placed on a Gakushin tester in accordance with JISL0849:2013 such that a first hard coat side surface thereof was a front side. Subsequently, a steel wool of #0000 was attached to a friction terminal of the Gakushin tester, and a load of 500 g was then placed. A surface of the test piece was rubbed reciprocatingly 100 times, and then the rubbed portion was visually observed. When no scratch was observed, an operation of additionally performing 100 reciprocating rubs and then visually observing the rubbed portion was repeated, and evaluation was performed according to the following criteria.

A: No scratch was observed even after 500 reciprocating rubs.

B: No scratch was observed after 400 reciprocating rubs, but a scratch could be observed after 500 reciprocating rubs.

C: No scratch was observed after 300 reciprocating rubs, but a scratch could be observed after 400 reciprocating rubs.

D: No scratch was observed after 200 reciprocating rubs, but a scratch could be observed after 300 reciprocating rubs.

E: No scratch was observed after 100 reciprocating rubs, but a scratch could be observed after 200 reciprocating rubs.

F: A scratch could be observed after 100 reciprocating rubs.

(ix) Surface Smoothness (Surface Appearance)

While surfaces (both surfaces) of a hard coat laminated film were irradiated with light of a fluorescent lamp by changing an incident angle in various directions, the surfaces were visually observed, and surface smoothness was evaluated according to the following criteria.

⊚: The surface had no undulation or scratch. Even when the surface was viewed closely by letting light pass therethrough, there was no impression of cloudiness.

○: When the surface was viewed closely by letting light pass therethrough, the surface had a portion giving an impression of slight cloudiness.

Δ: When the surface was viewed closely, the surface had slightly recognized undulations and scratches. The surface also gave an impression of cloudiness.

x: The surface had a large number of recognized undulations and scratches. The surface also gave a definite impression of cloudiness.

(x) Minimum Bending Radius

With reference to bending formability (B method) in JIS-K6902:2007, a test piece was conditioned at a temperature of 23° C.±2° C. and a relative humidity of 50±5% for 24 hours, and thereafter the test piece was bent at a bending temperature of 23° C.±2° C. at a bending line in a direction perpendicular to the machine direction of a hard coat laminated film such that a first hard coat side surface of the hard coat laminated film was on the outer side to form a curved surface, and the minimum bending radius was measured. The radius of the front face of the shaping jig having the smallest radius of the front face among shaping jigs with no crack generated was defined as the minimum bending radius. The "front face" has the same meaning as the term regarding a shaping jig in the B method defined in Paragraph 18.2 in JIS K6902:2007.

(xi) Cutting Processability (Condition of Curved Cutting-Processed Line)

A cut hole of a true circle with a diameter of 2 mm and a cut hole of a true circle with a diameter of 0.5 mm were formed in a hard coat laminated film using a router processing machine automatically controlled by a computer. A mill used at this time was a four-bladed super-hard-alloy mill with nicks, having a cylindrically round tip, and a blade diameter was appropriately selected according to a portion to be processed. Subsequently, a cut edge surface of the cut hole with a diameter of 2 mm was observed visually or with a microscope (100 times), and cutting processability was evaluated according to the following criteria. Similarly, a cut edge surface of the cut hole with a diameter of 0.5 mm was observed visually or with a microscope (100 times) and cutting processability was evaluated according to the following criteria. The result of the former case and the result of the latter case were listed in this order in Tables.

⊚: No crack or burr was observed even with a microscope.

○: No crack was observed even with a microscope. However, a burr was observed.

Δ: No crack was observed visually. However, a crack was observed with a microscope.

x: A crack was observed even visually.

Raw Materials Used (A) Polyfunctional (meth)acrylate (A-1) Dipentaerythritol hexaacrylate (hexafunctional)

(A-2) Pentaerythritol triacrylate (trifunctional)

(B) N-substituted (meth)acrylamide compound (B-1) Acryloyl morpholine (B-2) N,N-diethylacrylamide (B-3) N-hydroxyethylacrylamide (C) Inorganic fine particles having an average particle diameter of 1 to 300 nm (C-1) Silica fine particles which have been subjected to a surface treatment with a silane coupling agent having a vinyl group, and have an average particle diameter of 20 nm (D) Leveling agent (D-1) A silicone-acrylate copolymer leveling agent "DISPARLON NSH-8430HF" trade name) available from Kusumoto Chemicals, Ltd.: solid content 10% by mass (D-2) A silicone-acrylate copolymer leveling agent "BYK-3550" (trade name) available from BYK Japan KK: solid content 52% by mass (D-3) An acrylic polymer leveling agent "BYK-399" (trade name) available from BYK Japan KK: solid content 100% by mass (D-4) A silicone leveling agent "DISPARLON LS-480" (trade name) available from Kusumoto Chemicals, Ltd.: solid content 100% by mass (E) Water repelling agent (E-1) An acryloyl group-containing fluoropolyether water repelling agent "KY-1203" (trade name) available from Shin-Etsu Chemical Co., Ltd.: solid content 20% by mass (E-2) A methacryloyl group-containing fluoropolyether water repelling agent "FOMBLIN MT70" (trade name) available from Solvay S.A.: solid content 70% by mass (F) Silane coupling agent (F-1) N-2-(aminoethyl)-3-aminopropylmethyldimethoxysilane "KBM-602" (trade name) available from Shin-Etsu Chemical Co., Ltd.

(F-2) N-2-(aminoethyl)-3-aminopropyltrimethoxysilane "KBM-603" (trade name) available from Shin-Etsu Chemical Co., Ltd.

(F-3) 3-Aminopropyltrimethoxysilane "KBM-903" (trade name) available from Shin-Etsu Chemical Co., Ltd.

(F-4) 3-Mercaptopropylmethyldimethoxysilane "KBM-802" (trade name) available from Shin-Etsu Chemical Co., Ltd.

(F-5) 3-Glycidoxypropyltrimethoxysilane "KBM-403" (trade name) available from Shin-Etsu Chemical Co., Ltd.

(G) Optional component (G-1) A phenyl ketone photopolymerization initiator (1-hydroxycyclohexyl phenyl ketone) "SB-PI714" (trade name) available from Shuang Bang Industrial Corp.

Figure 2:
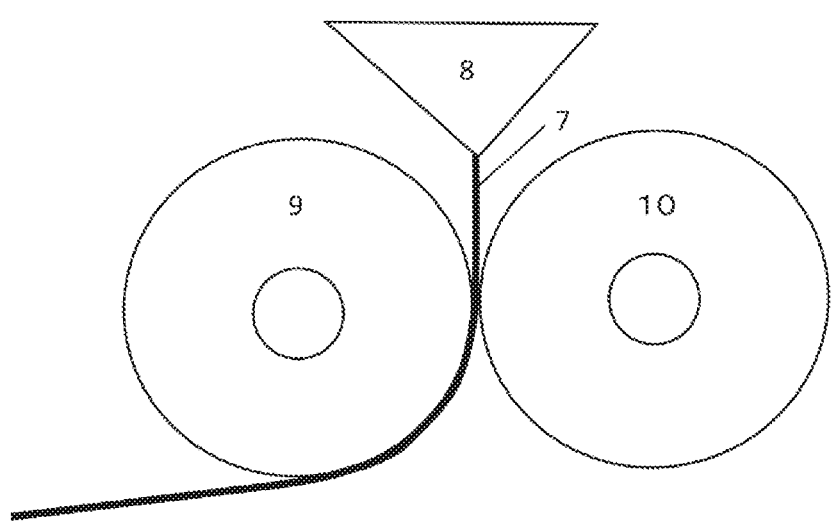
FIG. 2 is a conceptual diagram of an apparatus used for forming a transparent resin film in Examples.

(G-2) 1-Methoxy-2-propanol (P) Transparent resin film (P-1) Using an apparatus equipped with a two-kind/three-layer multimanifold-type co-extrusion T-die 8 and a winder having a mechanism for pressing a melted resin film 7 with a first mirror-finished roll 9 (i.e. a roll to hold a melted film and send the melted film to a subsequent transfer roll) and a second mirror-finished roll 10 (see FIG. 2), a two-kind/three-layer multilayer resin film in which both outer layers ((α1) layer and (α2) layer) were formed of a poly(meth)acrylimide resin "PLEXIMID TT50" (trade name) available from Evonik Degussa GmbH and an intermediate layer (β layer) was formed of an aromatic polycarbonate resin "CALIBRE 302-4" (trade name) available from Sumika Styron Polycarbonate Limited was continuously co-extruded from the co-extrusion T-die 8. This co-extruded product was supplied and introduced between the rotating first mirror-finished roll 9 and second mirror-finished roll 10 such that the (α1) layer was on the first mirror-finished roll 9 side, and was pressed to obtain a transparent resin film having a total thickness of 250 μm, a layer thickness of the (α1) layer of 80 μm, a layer thickness of the (β) layer of 90 μm, and a layer thickness of the (α2) layer of 80 μm. As setting conditions at this time, a set temperature of the T-die

8 was 300° C., a set temperature of the first mirror-finished roll 9 was 130° C., a set temperature of the second mirror-finished roll 10 was 120° C., and a wind-up speed was 6.5 m/min.

Example 1

A hard coat forming coating material was obtained by mixing and stirring 100 parts by mass of component (A-1), 3 parts by mass of component (B-1), 2 parts by mass (0.40 parts by mass in terms of solid content) of component (E-1), 0.06 parts by mass (0.042 parts by mass in terms of solid content) of component (E-2), 4 parts by mass of component (G-1), and 100 parts by mass of component (G-2). Table 1 shows the components and blending amounts thereof. As far as the (E-1) and the (E-2) are concerned, Table 1 shows values in terms of solid content. Subsequently, the coating material obtained above was applied onto a surface of the (P-1) on the (α2) layer side using a die-type applicator such that the wet thickness thereof was 21 μm (thickness after curing 11 μm). Subsequently, the resulting product was allowed to pass through a drying furnace set at an inner temperature of 90° C. at a line speed such that the time required to pass from the inlet to the outlet was one minute. Thereafter, the resulting product was treated using a curing apparatus having a high-pressure mercury lamp type ultraviolet irradiator 11 and a mirror-finished metal roll 12 having a diameter of 25.4 cm disposed opposite to each other (see FIG. 3) under conditions of a temperature of the mirror-finished metal roll 12 of 60° C. and an integrated amount of light of 480 mJ/cm$^2$ to form a hard coat. In FIG. 3, the reference numeral 13 indicates a web, and the reference numeral 14 indicates a holding angle. A hard coat was also formed on a surface of the (P-1) on the (α1) layer side to obtain a hard coat laminated film. Using the hard coat formed later (i.e. the hard coat formed on the surface of the (P-1) on the (α1) layer side) as the first hard coat, measurement and evaluation of physical properties in the tests (i) to (ix) were performed. Table 1 shows results thereof.

Examples 2 to 8

A hard coat laminated film was produced, and measurement and evaluation of physical properties thereof were performed in a similar manner to Example 1 except that each formulation of coating materials used was changed as shown in Table 1. Table 1 shows results thereof.

It has been found that a hard coat is formed without performing any adhesion-facilitating treatment on a surface of a poly(meth)acrylimide resin in the hard coat laminated film according to at least one embodiment, but adhesiveness between the hard coat and the transparent resin film is good. In addition, it has been also found that the hard coat laminated film according to at least one embodiment is excellent in transparency, surface hardness, color tone, abrasion resistance, and surface smoothness.

An aspect of a hard coat laminated film including a second hard coat, a first hard coat, and a transparent resin film layer from a surface layer side.

Hereinafter, a case where the hard coat laminated film according to at least one embodiment includes, from a surface layer side, a second hard coat, a first hard coat, and a transparent resin film layer will described with reference to Examples.

(H1) First hard coat forming coating material (H1-1) A first hard coat forming coating material was obtained by mixing and stirring 100 parts by mass of the (A-2), 12 parts by mass of the (B-1), 140 parts by mass of the (C-1), 2 parts by mass (0.2 parts by mass in terms of solid content) of the (D-1), 17 parts by mass of the (G-1), and 200 parts by mass of the (G-2). Table 2 shows the components and blending amounts thereof. As far as the (D-1) is concerned, Table 2 shows values in terms of solid content.

(H1-2 to H1-15) A first hard coat forming coating material was obtained in a similar manner to the (H1-1) except that each formation was changed as shown in Table 2 or 3. As far as the (D-1) and the (D-2) are concerned, Tables 2 and 3 each show values in terms of solid content.

TABLE 2

| Component | First hard coat forming coating material | | | | | | |
|---|---|---|---|---|---|---|---|
| (part by mass) | H1-1 | H1-2 | H1-3 | H1-4 | H1-5 | H1-6 | H1-7 |
| A-2 | 100 | 100 | 100 | 100 | 100 | 100 | 100 |
| B-1 | 12 | 12 | 12 | 12 | 12 | 12 | 12 |
| C-1 | 140 | 140 | 140 | 140 | 140 | 140 | 140 |
| D-1 | 0.2 | — | 0.1 | 0.4 | 0.6 | 1.5 | — |
| D-2 | — | — | — | — | — | — | 0.2 |
| D-3 | — | — | — | — | — | — | — |
| D-4 | — | — | — | — | — | — | — |
| G-1 | 17 | 17 | 17 | 17 | 17 | 17 | 17 |
| G-2 | 200 | 200 | 200 | 200 | 200 | 200 | 200 |

TABLE 1

| | | Example 1 | Example 2 | Example 3 | Example 4 | Example 5 | Example 6 | Example 7 | Example 8 |
|---|---|---|---|---|---|---|---|---|---|
| Coating material blending (part by mass) | A-1 | 100 | 100 | 100 | 100 | 100 | 100 | 100 | 100 |
| | B-1 | 3 | 12 | 31 | 62 | — | — | — | — |
| | B-2 | — | — | — | — | — | 7 | 1 | — |
| | B-3 | — | — | — | — | — | — | — | 3 |
| | E-1 | 0.40 | 0.40 | 0.40 | 0.40 | 0.40 | 0.40 | 0.40 | 0.40 |
| | E-2 | 0.042 | 0.042 | 0.042 | 0.042 | 0.042 | 0.042 | 0.042 | 0.042 |
| | G-1 | 4 | 4 | 5 | 6 | 4 | 4 | 4 | 4 |
| | G-2 | 100 | 105 | 125 | 150 | 95 | 100 | 95 | 100 |
| Evaluation results | Total light transmittance % | 90.8 | 90.9 | 91.0 | 90.9 | 90.8 | 90.4 | 90.7 | 90.5 |
| | Haze % | 0.4 | 0.4 | 0.4 | 0.4 | 0.4 | 0.4 | 0.4 | 0.4 |
| | Pencil hardness | 5H | 5H | 4H | 4H | 5H | 5H | 5H | 5H |
| | Yellowness index | 0.2 | 0.2 | 0.2 | 0.2 | 0.2 | 0.2 | 0.2 | 0.2 |
| | Square lattice pattern test | Classification 2 | Classification 0 | Classification 0 | Classification 0 | Classification 4 | Classification 1 | Classification 3 | Classification 3 |
| | Water contact angle deg | 112 | 110 | 110 | 108 | 112 | 110 | 111 | 109 |
| | Abrasion resistance 1 | A | A | A | C | A | A | A | A |
| | Abrasion resistance 2 | A | A | A | F | A | A | A | A |
| | Surface smoothness | ◉ | ◉ | ◉ | ◉ | ◉ | ◉ | ◉ | ◉ |

TABLE 3

| Component (part by mass) | First hard coat forming coating material | | | | | | | |
|---|---|---|---|---|---|---|---|---|
| | H1-8 | H1-9 | H1-10 | H1-11 | H1-12 | H1-13 | H1-14 | H1-15 |
| A-2 | 100 | 100 | 100 | 100 | 100 | 100 | 100 | 100 |
| B-1 | 12 | 12 | 12 | 12 | 12 | 12 | 12 | 12 |
| C-1 | 140 | 140 | 140 | 80 | 200 | 30 | 400 | — |
| D-1 | — | — | — | 0.2 | 0.2 | 0.2 | 0.2 | 0.2 |
| D-2 | 0.4 | — | — | — | — | — | — | — |
| D-3 | — | 0.3 | — | — | — | — | — | — |
| D-4 | — | — | 0.3 | — | — | — | — | — |
| G-1 | 17 | 17 | 17 | 17 | 17 | 17 | 17 | 17 |
| G-2 | 200 | 200 | 200 | 155 | 250 | 120 | 420 | 100 |

(H2) Second hard coat forming coating material (H2-1) A second hard coat forming coating material was obtained by mixing and stirring 100 parts by mass of the (A-1), 2 parts by mass (0.40 parts by mass in terms of solid content) of the (E-1), 0.06 parts by mass (0.042 parts by mass in terms of solid content) of the (E-2), 0.5 parts by mass of the (F-1), 4 parts by mass of the (G-1), and 100 parts by mass of the (G-2). Table 4 shows the components and blending amounts thereof. As far as the (E-1) and the (E-2) are concerned, Table 4 shows values in terms of solid content.

(H2-2 to H2-16) A second hard coat forming coating material was obtained in a similar manner to the (H2-1) except that each formation was changed as shown in Table 4 or 5. As far as the (E-1) and the (E-2) are concerned, Tables 4 and 5 each show values in terms of solid content.

Example 9

The (H1-1) was applied onto the surface of the (P-1) on the (α2) layer side using a die-type applicator such that the wet thickness was 40 μm (thickness after curing 22 μm). Subsequently, the resulting product was allowed to pass through a drying furnace set at an inner temperature of 90° C. at a line speed such that the time required to pass from the inlet to the outlet was one minute. Thereafter, the resulting product was treated using a curing apparatus having a high-pressure mercury lamp type ultraviolet irradiator 11 and a mirror-finished metal roll 12 having a diameter of 25.4 cm disposed opposite to each other (see FIG. 3) under conditions of a temperature of the mirror-finished metal roll 12 of 60° C. and an integrated amount of light of 480 mJ/cm$^2$ to form a third hard coat. Subsequently, the (H1-1) was applied onto the surface of the (P-1) on the (α1) layer side

TABLE 4

| Component (part by mass) | Second hard coat forming coating material | | | | | | | |
|---|---|---|---|---|---|---|---|---|
| | H2-1 | H2-2 | H2-3 | H2-4 | H2-5 | H2-6 | H2-7 | H2-8 |
| A-1 | 100 | 100 | 100 | 100 | 100 | 100 | 100 | 100 |
| C-1 | — | — | — | — | — | — | 20 | — |
| E-1 | 0.40 | 0.080 | 0.80 | 2.0 | — | 8.0 | 0.40 | 0.40 |
| E-2 | 0.042 | 0.0084 | 0.084 | 0.21 | — | 0.84 | 0.042 | 0.042 |
| F-1 | 0.5 | 0.5 | 0.5 | 0.5 | 0.5 | 0.5 | 0.5 | — |
| F-2 | — | — | — | — | — | — | — | — |
| F-3 | — | — | — | — | — | — | — | — |
| F-4 | — | — | — | — | — | — | — | — |
| F-5 | — | — | — | — | — | — | — | — |
| G-1 | 4 | 4 | 4 | 4 | 4 | 4 | 4 | 4 |
| G-2 | 100 | 100 | 100 | 100 | 100 | 80 | 130 | 100 |

TABLE 5

| Component (part by mass) | Second hard coat forming coating material | | | | | | | |
|---|---|---|---|---|---|---|---|---|
| | H2-9 | H2-10 | H2-11 | H2-12 | H2-13 | H2-14 | H2-15 | H2-16 |
| A-1 | 100 | 100 | 100 | 100 | 100 | 100 | 100 | 100 |
| C-1 | — | — | — | — | — | — | — | — |
| E-1 | 0.40 | 0.40 | 0.40 | 0.40 | 0.40 | 0.40 | 0.40 | 0.40 |
| E-2 | 0.042 | 0.042 | 0.042 | 0.042 | 0.042 | 0.042 | 0.042 | 0.042 |
| F-1 | 0.01 | 0.1 | 1 | 5 | — | — | — | — |
| F-2 | — | — | — | — | 0.5 | — | — | — |
| F-3 | — | — | — | — | — | 0.5 | — | — |
| F-4 | — | — | — | — | — | — | 0.5 | — |
| F-5 | — | — | — | — | — | — | — | 0.5 |
| G-1 | 4 | 4 | 4 | 4 | 4 | 4 | 4 | 4 |
| G-2 | 100 | 100 | 100 | 105 | 100 | 100 | 100 | 100 | using a die-type applicator such that the wet thickness was 40 μm (thickness after curing 22 μm). Subsequently, the resulting product was allowed to pass through a drying furnace set at an inner temperature of 90° C. at a line speed such that the time required to pass from the inlet to the outlet was one minute. Thereafter, the resulting product was treated using a curing apparatus having a high-pressure mercury lamp type ultraviolet irradiator 11 and a mirror-finished metal roll 12 having a diameter of 25.4 cm disposed opposite to each other (see FIG. 3) under conditions of a temperature of the mirror-finished metal roll 12 of 90° C. and an integrated amount of light of 80 mJ/cm². The wet coat of the (H1-1) became a coat in a set-to-touch state. Subsequently, the (H2-1) was applied onto the coat of the (H1-1) in a set-to-touch state using a die-type applicator such that the wet thickness was 4 μm (thickness after curing 2 μm). Subsequently, the resulting product was allowed to pass through a drying furnace set at an inner temperature of 80° C. at a line speed such that the time required to pass from the inlet to the outlet was one minute. Thereafter, the resulting product was treated using a curing apparatus having a high-pressure mercury lamp type ultraviolet irradiator 11 and a mirror-finished metal roll 12 having a diameter of 25.4 cm disposed opposite to each other (see FIG. 3) under conditions of a temperature of the mirror-finished metal roll 12 of 60° C. and an integrated amount of light of 480 mJ/cm² to form a second hard coat and a first hard coat, and a hard coat laminated film was obtained. This hard coat laminated film was subjected to the above tests (i) to (xi) for measurement and evaluation of physical properties. Table 6 shows results thereof. In Tables, the first HC means the first hard coat, the second HC means the second hard coat, and the third HC means the third hard coat.

Examples 10 to 23

A hard coat laminated film was produced, and the above tests (i) to (xi) for measurement and evaluation of physical properties thereof were performed in a similar manner to Example 9 except that a first hard coat forming coating material and a third hard coat forming coating material shown in any one of Tables 6 to 8 were used. Any one of Tables 6 to 8 shows results thereof.

Examples 24 to 38

A hard coat laminated film was produced, and the above tests (i) to (xi) for measurement and evaluation of physical properties thereof were performed in a similar manner to Example 9 except that a second hard coat forming coating material shown in Table 8 or 9 was used. Table 8 or 9 shows results thereof.

Examples 39 to 42

A hard coat laminated film was produced, and the above tests (i) to (xi) for measurement and evaluation of physical properties thereof were performed in a similar manner to Example 9 except that the thicknesses of the first hard coat and the third hard coat were changed as shown in Table 10. Table 10 shows results thereof.

Examples 43 to 46

A hard coat laminated film was produced, and the above tests (i) to (xi) for measurement and evaluation of physical properties thereof were performed in a similar manner to Example 9 except that the thickness of the second hard coat was changed as shown in Table 10. Table 10 shows results thereof.

TABLE 6

| | | Example 9 | Example 10 | Example 11 | Example 12 | Example 13 | Example 14 | Example 15 |
|---|---|---|---|---|---|---|---|---|
| Composition | First HC coating material | H1-1 | H1-2 | H1-3 | H1-4 | H1-5 | H1-6 | H1-7 |
| | Thickness of first HC μm | 22 | 22 | 22 | 22 | 22 | 22 | 22 |
| | Second HC coating material | H2-1 | H2-1 | H2-1 | H2-1 | H2-1 | H2-1 | H2-1 |
| | Thickness of second HC μm | 2 | 2 | 2 | 2 | 2 | 2 | 2 |
| | Third HC coating material | H1-1 | H1-2 | H1-3 | H1-4 | H1-5 | H1-6 | H1-7 |
| | Thickness of third HC μm | 22 | 22 | 22 | 22 | 22 | 22 | 22 |
| Evaluation results | Total light transmittance % | 91.1 | 91.1 | 91.1 | 91.1 | 91.1 | 91.1 | 91.1 |
| | Haze % | 0.4 | 0.5 | 0.4 | 0.4 | 0.4 | 0.7 | 0.4 |
| | Pencil hardness | 7H | 7H | 7H | 7H | 7H | 7H | 7H |
| | Yellowness index | 0.3 | 0.3 | 0.3 | 0.3 | 0.3 | 0.3 | 0.3 |
| | Square lattice pattern test | Classification 0 | Classification 0 | Classification 0 | Classification 0 | Classification 0 | Classification 2 | Classification 0 |
| | Water contact angle deg | 116 | 116 | 116 | 116 | 116 | 116 | 116 |
| | Abrasion resistance 1 | A | B | A | A | A | A | A |
| | Abrasion resistance 2 | A | B | A | A | A | A | A |
| | Surface smoothness | ◎ | ○ | ○ | ◎ | ◎ | ◎ | ◎ |
| | Minimum bending radius mm | 30 | 30 | 30 | 30 | 30 | 30 | 30 |
| | Cutting processability | ◎-◎ | ◎-◎ | ◎-◎ | ◎-◎ | ◎-◎ | ◎-◎ | ◎-◎ |

TABLE 7

| | | Example 16 | Example 17 | Example 18 | Example 19 | Example 20 | Example 21 | Example 22 |
|---|---|---|---|---|---|---|---|---|
| Composition | First HC coating material | H1-8 | H1-9 | H1-10 | H1-11 | H1-12 | H1-13 | H1-14 |
| | Thickness of first HC μm | 22 | 22 | 22 | 22 | 22 | 22 | 22 |
| | Second HC coating material | H2-1 | H2-1 | H2-1 | H2-1 | H2-1 | H2-1 | H2-1 |
| | Thickness of second HC μm | 2 | 2 | 2 | 2 | 2 | 2 | 2 |

TABLE 7-continued

|  |  | Example 16 | Example 17 | Example 18 | Example 19 | Example 20 | Example 21 | Example 22 |
|---|---|---|---|---|---|---|---|---|
|  | Third HC coating material | H1-8 | H1-9 | H1-10 | H1-11 | H1-12 | H1-13 | H1-14 |
|  | Thickness of third HC μm | 22 | 22 | 22 | 22 | 22 | 22 | 22 |
| Evaluation results | Total light transmittance % | 91.1 | 91.1 | 91.1 | 91.3 | 90.2 | 91.3 | 88.2 |
|  | Haze % | 0.4 | 0.7 | 0.7 | 0.4 | 0.8 | 0.3 | 3.7 |
|  | Pencil hardness | 7H | 7H | 7H | 6H | 8H | 3H | 9H |
|  | Yellowness index | 0.3 | 0.3 | 0.3 | 0.3 | 0.3 | 0.3 | 0.3 |
|  | Square lattice pattern test | Classification 0 | Classification 0 | Classification 2 | Classification 0 | Classification 0 | Classification 0 | Classification 0 |
|  | Water contact angle deg | 116 | 116 | 116 | 116 | 116 | 116 | 116 |
|  | Abrasion resistance 1 | A | A | A | A | A | A | A |
|  | Abrasion resistance 2 | A | A | A | A | A | A | A |
|  | Surface smoothness | ◎ | ○ | ◎ | ◎ | ◎ | ◎ | ◎ |
|  | Minimum bending radius mm | 30 | 30 | 30 | 20 | 40 | 20 | 50 |
|  | Cutting processability | ◎-◎ | ◎-◎ | ◎-◎ | ◎-◎ | ◎-◎ | ◎-◎ | ◎-◎ |

TABLE 8

|  |  | Example 23 | Example 24 | Example 25 | Example 26 | Example 27 | Example 28 | Example 29 | Example 30 |
|---|---|---|---|---|---|---|---|---|---|
| Composition | First HC coating material | H1-15 | H1-1 | H1-1 | H1-1 | H1-1 | H1-1 | H1-1 | H1-1 |
|  | Thickness of first HC μm | 22 | 22 | 22 | 22 | 22 | 22 | 22 | 22 |
|  | Second HC coating material | H2-1 | H2-2 | H2-3 | H2-4 | H2-5 | H2-6 | H2-7 | H2-8 |
|  | Thickness of second HC μm | 2 | 2 | 2 | 2 | 2 | 2 | 2 | 2 |
|  | Third HC coating material | H1-15 | H1-1 | H1-1 | H1-1 | H1-1 | H1-1 | H1-1 | H1-1 |
|  | Thickness of third HC μm | 22 | 22 | 22 | 22 | 22 | 22 | 22 | 22 |
| Evaluation results | Total light transmittance % | 91.5 | 91.1 | 91.0 | 90.6 | 91.1 | 90.0 | 90.3 | 91.1 |
|  | Haze % | 0.2 | 0.3 | 0.5 | 1.5 | 0.3 | 3.7 | 0.5 | 0.4 |
|  | Pencil hardness | H | 7H | 7H | 7H | 5H | 7H | 7H | 7H |
|  | Yellowness index | 0.3 | 0.3 | 0.3 | 0.3 | 0.3 | 0.3 | 0.3 | 0.3 |
|  | Square lattice pattern test | Classification 0 | Classification 0 | Classification 0 | Classification 0 | Classification 0 | Classification 0 | Classification 0 | Classification 4 |
|  | Water contact angle deg | 116.0 | 115 | 116 | 118 | 72.1 | 119 | 116 | 116 |
|  | Abrasion resistance 1 | A | B | A | A | E | A | E | A |
|  | Abrasion resistance 2 | A | A | A | A | D | A | F | A |
|  | Surface smoothness | ◎ | ◎ | ◎ | ◎ | ◎ | ◎ | ◎ | ◎ |
|  | Minimum bending radius mm | 20.0 | 30 | 30 | 30 | 30 | 30 | 30 | 30 |
|  | Cutting processability | ◎-◎ | ◎-◎ | ◎-◎ | ◎-◎ | ◎-◎ | ◎-◎ | ◎-◎ | ◎-◎ |

TABLE 9

|  |  | Example 31 | Example 32 | Example 33 | Example 34 | Example 35 | Example 36 | Example 37 | Example 38 |
|---|---|---|---|---|---|---|---|---|---|
| Composition | First HC coating material | H1-1 | H1-1 | H1-1 | H1-1 | H1-1 | H1-1 | H1-1 | H1-1 |
|  | Thickness of first HC μm | 22 | 22 | 22 | 22 | 22 | 22 | 22 | 22 |
|  | Second HC coating material | H2-9 | H2-10 | H2-11 | H2-12 | H2-13 | H2-14 | H2-15 | H2-16 |
|  | Thickness of second HC μm | 2 | 2 | 2 | 2 | 2 | 2 | 2 | 2 |
|  | Third HC coating material | H1-1 | H1-1 | H1-1 | H1-1 | H1-1 | H1-1 | H1-1 | H1-1 |
|  | Thickness of third HC μm | 22 | 22 | 22 | 22 | 22 | 22 | 22 | 22 |
| Evaluation results | Total light transmittance % | 91.1 | 91.1 | 91.1 | 91.1 | 91.1 | 91.1 | 91.1 | 91.1 |
|  | Haze % | 0.4 | 0.4 | 0.4 | 0.4 | 0.4 | 0.4 | 0.4 | 0.4 |
|  | Pencil hardness | 7H | 7H | 7H | 7H | 7H | 7H | 7H | 7H |
|  | Yellowness index | 0.3 | 0.3 | 0.3 | 0.3 | 0.3 | 0.3 | 0.3 | 0.3 |
|  | Square lattice pattern test | Classification 1 | Classification 0 | Classification 0 | Classification 0 | Classification 0 | Classification 0 | Classification 0 | Classification 3 |
|  | Water contact angle deg | 116 | 116 | 116 | 116 | 116 | 116 | 116 | 116 |
|  | Abrasion resistance 1 | A | A | A | A | A | A | A | A |
|  | Abrasion resistance 2 | A | A | A | A | A | A | A | A |
|  | Surface smoothness | ◎ | ◎ | ◎ | ◎ | ◎ | ◎ | ◎ | ◎ |
|  | Minimum bending radius mm | 30 | 30 | 30 | 30 | 30 | 30 | 30 | 20 |
|  | Cutting processability | ◎-◎ | ◎-◎ | ◎-◎ | ◎-◎ | ◎-◎ | ◎-◎ | ◎-◎ | ◎-◎ |

TABLE 10

|  |  | Example 39 | Example 40 | Example 41 | Example 42 | Example 43 | Example 44 | Example 45 | Example 46 |
|---|---|---|---|---|---|---|---|---|---|
| Composition | First HC coating material | H1-1 | H1-1 | H1-1 | H1-1 | H1-1 | H1-1 | H1-1 | H1-1 |
|  | Thickness of first HC µm | 15 | 18 | 25 | 35 | 22 | 22 | 22 | 22 |
|  | Second HC coating material | H2-1 | H2-1 | H2-1 | H2-1 | H2-1 | H2-1 | H2-1 | H2-1 |
|  | Thickness of second HC µm | 2 | 2 | 2 | 2 | 0.5 | 1 | 3 | 5 |
|  | Third HC coating material | H1-1 | H1-1 | H1-1 | H1-1 | H1-1 | H1-1 | H1-1 | H1-1 |
|  | Thickness of third HC µm | 15 | 18 | 25 | 35 | 22 | 22 | 22 | 22 |
| Evaluation results | Total light transmittance % | 92.2 | 91.9 | 91.1 | 90.7 | 91.1 | 91.1 | 91.1 | 91.1 |
|  | Haze % | 0.3 | 0.3 | 0.3 | 0.3 | 0.4 | 0.4 | 0.4 | 0.4 |
|  | Pencil hardness | 5H | 7H | 7H | 9H | 5H | 7H | 7H | 7H |
|  | Yellowness index | 0.3 | 0.3 | 0.3 | 0.3 | 0.3 | 0.3 | 0.3 | 0.3 |
|  | Square lattice pattern test | Classification 0 | Classification 0 | Classification 0 | Classification 0 | Classification 0 | Classification 0 | Classification 0 | Classification 2 |
|  | Water contact angle deg | 116 | 116 | 116 | 116 | 116 | 116 | 116 | 116 |
|  | Abrasion resistance 1 | A | A | A | A | B | A | A | A |
|  | Abrasion resistance 2 | A | A | A | A | B | A | A | A |
|  | Surface smoothness | ◎ | ◎ | ◎ | ◎ | ◎ | ◎ | ◎ | ◎ |
|  | Minimum bending radius mm | 20 | 30 | 35 | 70 | 30 | 30 | 30 | 40 |
|  | Cutting processability | ◎-◯ | ◎-◯ | ◎-◯ | ◎-◯ | ◎-◯ | ◎-◯ | ◎-◯ | ◎-◯ |

It has been found that a preferable hard coat laminated film according to at least one embodiment has excellent adhesiveness between a hard coat and a film substrate, and generally it is also excellent in transparency, surface hardness, color tone, abrasion resistance, surface smoothness, bending resistance, and cutting processability. Therefore, the hard coat laminated film according to at least one embodiment can be suitably used as a member of an image display apparatus such as a liquid crystal display, a plasma display, or an electroluminescence display (including an image display apparatus having a touch panel function and an image display apparatus having no touch panel function), particularly as a display face plate of an image display apparatus having a touch panel function.

REFERENCE SIGNS LIST

1 Second hard coat
2 First hard coat
3 First poly(meth)acrylimide resin layer (α1)
4 Aromatic polycarbonate resin layer (β)
5 Second poly(meth)acrylimide resin layer (α2)
6 Third hard coat
7 Melted resin film
8 T-die
9 First mirror-finished roll
10 Second mirror-finished roll
11 Ultraviolet irradiator
12 Mirror-finished metal roll
13 Web
14 Holding angle

The invention claimed is:

1. A hard coat laminated film, comprising, from a surface layer side, a first hard coat and a transparent resin film layer,
   wherein the first hard coat and the transparent resin film layer are laminated directly,
   wherein the first hard coat is formed of a coating material comprising:
      (A) 100 parts by mass of a polyfunctional (meth) acrylate; and
      (B) 1 to 100 parts by mass of an N-substituted (meth) acrylamide compound, and
   wherein the transparent resin film is a transparent multilayer film or a transparent monolayer film made of a poly(meth)acrylimide resin, wherein the transparent multilayer film comprises a surface layer made of a poly(meth)acrylimide resin, the first hard coat being formed on the surface layer.

2. The hard coat laminated film according to claim 1, wherein component (B) is acryloyl morpholine.

3. The hard coat laminated film according to claim 1, wherein the first hard coat forming coating material further comprises (C) 5 to 300 parts by mass of inorganic fine particles having an average particle diameter of 1 to 300 nm.

4. The hard coat laminated film according to claim 1, comprising, from a surface layer side, a second hard coat, the first hard coat, and the transparent resin film layer,
   wherein the second hard coat is formed of a coating material comprising:
      (A) 100 parts by mass of the polyfunctional (meth) acrylate;
      (E) 0.01 to 7 parts by mass of a water repelling agent; and
      (F) 0.01 to 10 parts by mass of a silane coupling agent; and
   containing no inorganic particles.

5. The hard coat laminated film according to claim 1, wherein the first hard coat forming coating material further comprises (D) 0.01 to 1 part by mass of a leveling agent.

6. The hard coat laminated film according to claim 1, wherein the transparent resin film is a transparent multilayer film obtained by laminating:
   (α1) a first poly(meth)acrylimide resin layer;
   (β) an aromatic polycarbonate resin layer; and
   (α2) a second poly(meth)acrylimide resin layer, directly in this order.

7. An article comprising the hard coat laminated film according to claim 1.

8. An article comprising the hard coat laminated film according to claim 2.

9. An article comprising the hard coat laminated film according to claim 3.

10. An article comprising the hard coat laminated film according to claim 4.

11. An article comprising the hard coat laminated film according to claim 5.

12. An article comprising the hard coat laminated film according to claim 6.

13. A hard coat laminated film, comprising, from a surface layer side, a second hard coat, a first hard coat, and a transparent resin film layer,
   wherein the second hard coat is formed of a coating material containing no inorganic particles,
   wherein the first hard coat is formed of a coating material comprising:
      (A) 100 parts by mass of a polyfunctional (meth) acrylate; and
      (B) 1 to 100 parts by mass of an N-substituted (meth) acrylamide compound, and
   wherein the transparent resin film is a transparent multilayer film or a transparent monolayer film made of a poly(meth)acrylimide resin, wherein the transparent multilayer film comprises a surface layer made of a poly(meth)acrylimide resin, the first hard coat being formed on the surface layer.

14. The hard coat laminated film according to claim 13, wherein the thickness of the second hard coat is from 0.5 to 5 μm.

15. The hard coat laminated film according to claim 14, wherein the thickness of the first hard coat is from 5 to 35 μm.

16. The hard coat laminated film according to claim 13, wherein the second hard coat is formed of a coating material comprising:
   (A) 100 parts by mass of the polyfunctional (meth) acrylate;
   (E) 0.01 to 7 parts by mass of a water repelling agent; and
   (F) 0.01 to 10 parts by mass of a silane coupling agent; and
   containing no inorganic particles.

\* \* \* \* \*